United States Patent
Simons

(10) Patent No.: US 11,700,265 B2
(45) Date of Patent: Jul. 11, 2023

(54) CUSTOMIZED VIEW OF RESTRICTED INFORMATION RECORDED INTO A BLOCKCHAIN

(71) Applicant: AMERICORP INVESTMENTS LLC, Denver, CO (US)

(72) Inventor: Jordan Simons, Denver, CO (US)

(73) Assignee: Americorp Investments LLC, Denver, CO (US)

( * ) Notice: Subject to any disclaimer, the term of this patent is extended or adjusted under 35 U.S.C. 154(b) by 150 days.

(21) Appl. No.: 17/153,411

(22) Filed: Jan. 20, 2021

(65) Prior Publication Data
US 2021/0144149 A1    May 13, 2021

Related U.S. Application Data

(63) Continuation-in-part of application No. 16/806,646, filed on Mar. 2, 2020, now Pat. No. 10,958,663,
(Continued)

(51) Int. Cl.
H04L 9/40    (2022.01)
H04L 9/32    (2006.01)
(Continued)

(52) U.S. Cl.
CPC ........ H04L 63/105 (2013.01); G06F 21/6254 (2013.01); G06N 20/00 (2019.01);
(Continued)

(58) Field of Classification Search
CPC ... H04L 63/105; H04L 9/0618; H04L 9/3226; H04L 9/50; H04L 9/3239; H04L 63/12;
(Continued)

(56) References Cited

U.S. PATENT DOCUMENTS

9,338,148 B2    5/2016  Polehn et al.
9,992,022 B1    6/2018  Chapman et al.
(Continued)

FOREIGN PATENT DOCUMENTS

AU    2019231692        9/2020
AU    2020260399 A1    11/2020
(Continued)

OTHER PUBLICATIONS

Japanese Patent Application No. 2020-546896, Office Action, 6 pages, dated Jun. 15, 2021.
(Continued)

*Primary Examiner* — Christopher A Revak
(74) *Attorney, Agent, or Firm* — Ortiz & Lopez, PLLC; Kermit D. Lopez; Luis M. Ortiz

(57) ABSTRACT

Systems, methods, and software are disclosed herein to generate a customized view of a blockchain transaction. A blockchain of block entries is maintained in a distributed network of nodes. The block entries each comprise a plurality of data portions and data access guidelines are received which govern access by a user to one or more of the data portions. A request to view one or more data portions of a block entry is received from the user. The data access guidelines for the user are applied to the request and the one or more data portions that are accessible by the request according to the data access guidelines are identified. A customized view of the block entry is generated which includes the one or more data portions determined to be accessible by the request.

25 Claims, 18 Drawing Sheets

Related U.S. Application Data which is a continuation of application No. 16/579,697, filed on Sep. 23, 2019, now Pat. No. 10,581,869, which is a continuation of application No. 16/294,745, filed on Mar. 6, 2019, now Pat. No. 10,425,426.

(60) Provisional application No. 62/701,947, filed on Jul. 23, 2018, provisional application No. 62/639,393, filed on Mar. 6, 2018.

(51) Int. Cl.
   *G06F 21/62* (2013.01)
   *H04L 9/06* (2006.01)
   *G06N 20/00* (2019.01)
   *H04L 9/00* (2022.01)

(52) U.S. Cl.
   CPC .......... *H04L 9/0618* (2013.01); *H04L 9/3226* (2013.01); *H04L 9/50* (2022.05)

(58) Field of Classification Search
   CPC ..... G06F 21/6254; G06F 21/64; G06N 20/00; G06N 3/02; G06N 7/005; G06N 20/10; G06N 7/01
   See application file for complete search history.

(56) References Cited

U.S. PATENT DOCUMENTS

| | | | |
|---|---|---|---|
| 10,121,172 | B2 | 11/2018 | Hudson et al. |
| 10,425,426 | B1* | 9/2019 | Simons ............ H04L 9/3239 |
| 10,528,776 | B1 | 1/2020 | Levy et al. |
| 10,581,869 | B2* | 3/2020 | Simons ............ H04L 9/0618 |
| 10,586,062 | B1 | 3/2020 | Rangan et al. |
| 10,951,626 | B2 | 3/2021 | Simons |
| 10,958,663 | B2* | 3/2021 | Simons ............ H04L 9/3239 |
| 2002/0091594 | A1 | 7/2002 | Rosenberg et al. |
| 2013/0091549 | A1 | 4/2013 | Joyce et al. |
| 2015/0332283 | A1 | 11/2015 | Witchey |
| 2017/0046664 | A1 | 2/2017 | Haldenby et al. |
| 2017/0161439 | A1 | 6/2017 | Raduchel et al. |
| 2017/0200137 | A1 | 7/2017 | Vilmont |
| 2017/0244721 | A1 | 8/2017 | Kurian et al. |
| 2017/0287090 | A1 | 10/2017 | Hunn et al. |
| 2017/0287593 | A1 | 10/2017 | Ovalle |
| 2017/0300627 | A1 | 10/2017 | Giordano et al. |
| 2017/0318141 | A1 | 11/2017 | Gerace et al. |
| 2018/0005492 | A1 | 1/2018 | Hall |
| 2018/0115426 | A1 | 4/2018 | Andrade |
| 2018/0167198 | A1 | 6/2018 | Muller et al. |
| 2018/0268617 | A1 | 9/2018 | Bruce et al. |
| 2018/0293557 | A1 | 10/2018 | Kim et al. |
| 2018/0342036 | A1 | 11/2018 | Zachary |
| 2018/0343126 | A1 | 11/2018 | Fallah et al. |
| 2019/0005739 | A1 | 1/2019 | Gazlay et al. |
| 2019/0026450 | A1 | 1/2019 | Egner et al. |
| 2019/0036700 | A1 | 1/2019 | Sundaresan |
| 2019/0036919 | A1 | 1/2019 | Andrade |
| 2019/0050854 | A1 | 2/2019 | Yang et al. |
| 2019/0068360 | A1 | 2/2019 | Bhattacharya et al. |
| 2019/0075108 | A1 | 3/2019 | Clarke et al. |
| 2019/0130698 | A1 | 5/2019 | Simons |
| 2019/0132131 | A1 | 5/2019 | Clements |
| 2019/0132138 | A1 | 5/2019 | Finlow-Bates et al. |
| 2019/0236598 | A1 | 8/2019 | Padmanabhan |
| 2019/0238550 | A1 | 8/2019 | Zhang et al. |
| 2019/0251527 | A1 | 8/2019 | Surdak |
| 2019/0273610 | A1 | 9/2019 | Fan et al. |
| 2019/0281066 | A1 | 9/2019 | Simons |
| 2019/0294514 | A1 | 9/2019 | Tang |
| 2019/0373472 | A1 | 12/2019 | Smith et al. |
| 2020/0014527 | A1 | 1/2020 | Subramaniam |
| 2020/0021600 | A1 | 1/2020 | Simons |
| 2020/0089895 | A1 | 3/2020 | Gollogly |
| 2020/0097924 | A1 | 3/2020 | Arora et al. |
| 2020/0174990 | A1* | 6/2020 | Pratkanis ............ H04L 9/3221 |
| 2020/0204563 | A1 | 6/2020 | Simons |
| 2020/0250683 | A1 | 8/2020 | Padmanabhan et al. |
| 2020/0320217 | A1 | 10/2020 | Shang et al. |
| 2020/0344233 | A1 | 10/2020 | Lai et al. |
| 2021/0144149 | A1 | 5/2021 | Simons |
| 2021/0314328 | A1 | 10/2021 | Simons |
| 2021/0352080 | A1 | 11/2021 | Simons |
| 2022/0141231 | A1 | 5/2022 | Simons |
| 2022/0150257 | A1 | 5/2022 | Simons |

FOREIGN PATENT DOCUMENTS

| | | | | |
|---|---|---|---|---|
| AU | 2021266194 A1 | 12/2021 | | |
| CA | 3129807 A1 | 9/2019 | | |
| CN | 106503994 A | 3/2017 | | |
| CN | 107391320 A | 11/2017 | | |
| CN | 107391944 A | 11/2017 | | |
| CN | 107508812 A | 12/2017 | | |
| CN | 108520462 A | 9/2018 | | |
| CN | 108563788 A | 9/2018 | | |
| CN | 108805309 A | 11/2018 | | |
| CN | 108922228 A | 11/2018 | | |
| CN | 109299958 A | 2/2019 | | |
| EP | 3761203 A1 * | 1/2021 | ............ | G06F 21/60 |
| JP | 2021072130 A | 5/2021 | | |
| KR | 102445254 B1 | 9/2022 | | |
| PH | 12020551369 A1 | 9/2021 | | |
| SG | 11202008382 | 9/2020 | | |
| SG | 10202107345 | 8/2021 | | |
| SG | 10202107346 S | 8/2021 | | |
| WO | 2018/039374 A1 | 3/2018 | | |
| WO | 2018039374 A1 | 3/2018 | | |
| WO | 2018/147519 A1 | 8/2018 | | |
| WO | 20181475519 A1 | 8/2018 | | |
| WO | 2018/163044 A1 | 9/2018 | | |
| WO | 2018163044 A1 | 9/2018 | | |
| WO | 2018/187873 A1 | 10/2018 | | |
| WO | 2018187873 A1 | 10/2018 | | |
| WO | 2018/200119 A1 | 11/2018 | | |
| WO | 2018200119 A1 | 11/2018 | | |
| WO | 2019/036804 A1 | 2/2019 | | |
| WO | 2019036804 A1 | 2/2019 | | |

OTHER PUBLICATIONS

Singapore Patent Application No. 11202008382Q, Notice of Allowance, 8 pages, dated Jun. 9, 2021.
Singapore Patent Application No. 11202008466X, Notice of Allowance, 8 pages, dated Jun. 4, 2021.
Amsden, Zachary et al., "The Libra Blockchain," 29 pages, Sep. 25, 2019.
Australian Patent Application No. 2020223734, Examination Report, 6 pages, dated Oct. 21, 2020.
Feuer, William, "Watch Zuckerberg's Congressional Testimony: 'I Actually Don't Know if Libra is Going to Work'," CNBC, 1 page, Oct. 23, 2019.
International Application No. PCT/US2019/021020, International Search Report & Written Opinion, 10 pages, dated Jun. 6, 2019.
International Application No. PCT/US2020/021587, ISR & Written Opinion, 12 pages, dated May 13, 2020.
Korean Patent Application No. 2020-7025682, Notice of Allowance, 3 pages, dated Oct. 12, 2020.
Chinese U.S. Appl. No. 201980017739.4, Office Action, 21 pages, dated Apr. 27, 2021.
Chinese Patent Application No. 202080002570.8, Office Action, 28 pages, dated Mar. 26, 2021.
Xu et al., "Housing rental system based on blockchain Technology", 2021, Journal of Physics: Conference Series, p. 1-7.
U.S. Appl. No. 17/199,533; List of References cited, Sep. 13, 2022.
U.S. Appl. No. 17/199,533; Non-final Office Action, dated Sep. 13, 2022.
U.S. Appl. No. 17/199,533; Notice of References Cited, Sep. 13, 2022.
U.S. Appl. No. 16/294,745, Non-final Rejection and List of References Cited, dated Jun. 10, 2019.

(56) References Cited

OTHER PUBLICATIONS

U.S. Appl. No. 17/199,533; Information Disclosure Statement; Jun. 10, 2019.
"Watch Zuckerberg's congressional: 'I actually don't know if libra is going to work'"; Oct. 23, 2019.
Korean Patent Application No. 10-2022-7025682, Notice of Allowance, dated Oct. 12, 2020.
PCT Patent Application No. PCT/US2020/021587, Notification of Transmittal of the International Search Report and the Written Opinion of the International Searching Authority, or the Declaration, dated May 13, 2020.
PCT Patent Application No. PCT/US2020/021587, Notification of Transmittal of the International Search Report and the Written Opinion of the International Searching Authority, or the Declaration, dated Jun. 6, 2019.
Australian Patent Application No. 2020223734, Examination report No. 1 for standard patent application, dated Oct. 21, 2022.
Zachary Amsden, et al., "The Libra Blockchain," Revised Sep. 25, 2019.
U.S. Appl. No. 17/199,533; Information Disclosure Statement, Mar. 12, 2021.
Japanese Patent Application No. 2020-546896, Notifications of Reasons for Refusal, Dispatch Date: Jun. 15, 2021.
Singapore Application No. 112020083820, Notice of Eligibility for Grant, Jun. 9, 2021.
Singapore Application No. 11202008466X, Notice of Eligibility for Grant, Jun. 4, 2021.
Chinese Patent Application No. 20190017739.4, First Office Action, dated Apr. 27, 2021.
European Patent Application No. EP3763102A4, Supplemental European Search Report & Annex to Supplemental European Search Report.
U.S. Appl. No. 17/206,290, Non-final office action dated Sept. 9, 2022.
Singapore Patent Application No. 10202250835Y, Allocation of Date of Filing, Oct. 22, 2022.

\* cited by examiner

CUSTOMIZED VIEW OF RESTRICTED INFORMATION RECORDED INTO A BLOCKCHAIN

CROSS-REFERENCE TO RELATED APPLICATIONS

This application is a continuation-in-part of U.S. patent application Ser. No. 16/806,646 filed Mar. 2, 2020, entitled "Customized View Of Restricted Information Recorded Into A Blockchain," which issued as U.S. Pat. No. 10,958,663 on Mar. 23, 2021; which is a continuation of U.S. patent application Ser. No. 16/579,697 filed Sep. 23, 2019, entitled "Customized View Of Restricted Information Recorded Into A Blockchain," issued as U.S. Pat. No. 10,581,869 on Mar. 3, 2020; which is a continuation of U.S. patent application Ser. No. 16/294,745 filed Mar. 6, 2019, entitled "Customized View Of Restricted Information Recorded Into A Blockchain," issued as U.S. Pat. No. 10,425,426 on Sep. 24, 2019; which claims priority to U.S. Provisional Patent Application No. 62/639,393 filed Mar. 6, 2018, entitled "Customized View of Restricted Transactions Recorded into a Blockchain," and U.S. Provisional Patent Application No. 62/701,947 filed Jul. 23, 2018, entitled "Customized View of Restricted Information Recorded into a Blockchain," each of which are incorporated herein by reference in their entirety for all purposes.

TECHNICAL FIELD

Aspects of the disclosure are related to computing hardware and software technology, and in particular to systems and methods to generate a customized view of restricted transactions recorded into a blockchain.

TECHNICAL BACKGROUND

Blockchains allow a network of users to make a digital ledger of data and share the data among the other users in the network. Unlike previous database structures, the blockchain database is maintained by a multitude of independent nodes spread across a large distributed network. When a transaction is recorded into the blockchain database, it is very difficult, if not impossible, to change or remove that data from the database since the data is stored in more than one node in the distributed network. Therefore, data is added into the blockchain database by multiple users and changing the recorded data would require each of these users (or a majority of them) to agree to the change. This distribution of control to add, edit, and remove data from the blockchain database creates trust amongst users in the network, especially when users are not familiar with one another.

SUMMARY

An enhanced system, method, and software application are disclosed herein to generate a customized view of a blockchain transaction. A blockchain of block entries requested by a plurality of users from user devices is maintained in a distributed network of nodes. The block entries each comprise a plurality of data portions that are each associated with an access level. A request to view one or more data portions of a block entry is received which includes an access code associated with at least one access level. The access code in the request is evaluated with the blockchain of block entries to identify one or more data portions associated with the access level. A customized view of the block entry is generated which includes the one or more data portions associated with the access level.

Various embodiments provide techniques to store and provide access to information an owner intends to keep private but in public ledger that can be seen and audited by authorized entities or individuals. There are privacy laws world-wide that require information to be kept private. Various embodiments can ensure compliance with those privacy laws by ensuring the data is stored in correct formats and only accessible in compliant manners. As another example, there are businesses and governments that do not want their private information, knowledge or trade secrets to become known. While these groups do not have anything to hide, having all of their information in an open forum where anyone has viewability or knowledge of how people, businesses, governments, or the like operate will bring on loss, theft and increased competition.

For example, in the gaming industry, customers social security numbers, biometrics, addresses, photos, driver's license, prior game play, IRS tax notices, win/loss, comps, loyalty card/player card number information, birth dates, known associates, spouse/girlfriend, favorite teams, liked/disliked activities, tipping amounts, ATM use while on property, known electronic wallets, credit/debit cards used, cryptocurrency wallets used and the like can all be kept on a blockchain with other customer information. The customer would not want any of this information viewable in a public format and public access may create legal liabilities for the casinos. Various embodiments use various encryption and hashing techniques to securely store the data on the blockchain and only allow authorized users to view the data. As an example, the customer may enter into a tournament and his name or player number may be used to identify him in a public forum but none of the other private information would be available for anyone to see other than users with the correct access which would include the user, proper casino staff, auditors, regulators, or the like.

Logistics provides another direct application of the technology. For example, tracking of packages or cargo, movement of commodities from one place to another is important. All information can be included in what is being transported from where the cargo came from and is going to. At various points, the cargo may be scanned so the precise location is known for the cargo at specific times. This can be entered into the blockchain record. In addition, the cargo can be associated with specific vessels, trucks, vans, or other delivery mechanisms (e.g., delivery drones) and the GPS location of that delivery mechanism can be tracked in real-time, upon request, or at certain time intervals. Additional information, such as the buyer, the seller, the owner insurance information, and the like can be reported as well as demurrage tied to GPS recorded on a blockchain. Companies and/or governments do not want everyone to know their business for a variety of reasons but need the ability to audit and prove to inspectors, controllers or regulators what they are or were doing at a certain time/place. The ability to keep things private is mandatory. As such, various embodiments can use a combination of private, public, and hybrid blockchains to store the information. Moreover, various encryption schemes and access levels can be associated with individual portions of the data to ensure privacy where needed or wanted while granting access when necessary.

In some embodiments, the technology can provide specific applications to the defense industry. For example, the US government needs the ability to audit and control purchasing, logistics, supply, troop movement, and the like. This information if it falls into the wrong hands could have deadly consequences. Obfuscation of certain aspects of information in keeping them private is imperative to the success of a mission. Having the ability to classify the data and allow access is imperative to make sure only the people required have the ability to access the data (e.g., to see, monitor, work on, or audit, etc.) while anyone that does not have access is not able to see the data portions. In some embodiments, the system may automatically review documents relevant to a query and automatically apply one or more redaction filters based on the user's clearance status.

Some embodiments allow a data platform to connect to electronic voting machines. These machines can directly report information about voters, the ballots, and cast votes to the data platform for storage in a blockchain. The data platform can encrypt and set access levels for access to the voting records. For example, the voting machines may collect a person's information, social security number, address, party, biometrics, driver's license number, photo, or the like. As such, much of this information used in an election there needs to be kept private from the public, some information may be public (e.g., that a person did vote in a particular election, their party affiliation, or the like). Moreover, some embodiments provide for the use of automated techniques for identifying and/or eliminating voter fraud. For example, some embodiments, may use an artificial intelligence or machine learning engine to review the voter data stored in the blockchain and identify voters voting twice, illegal voters, or the like.

In addition to the examples provided above, the technology may be used in banking, jury voting, court proceedings, healthcare, fire arm sales, retail sales, pharmaceuticals, pensions, financial transactions, insurance, and many other applications where auditing, regulatory compliance, public viewing of data, private viewing of data, and the like are needed.

Some embodiments of the present technology may use optional markers under the hybrid format. For example, in some embodiment the system may have the ability of setting things to private (not viewable by people without access), public (viewable by everyone), or a hybrid of the two (some information is public and some information is private). There are circumstances that a public blockchain should be used and can be totally transparent for everyone to see. There are also some cases where some privacy for some of the information is required in order to meet privacy laws or for the mere fact that people do not want others to know that they are the person or organization who is responsible for doing something which would be the hybrid format. The ability to obfuscate or keep private certain information is imperative for the above industries.

In accordance with various embodiments that use the private or hybrid format, there are at least two options for securing the data. For example, in some embodiments, a total obfuscation of information can be done by applying encryption to unlock. Some embodiments may use multiple layers of encryption so that portions of the data can be limited and accessible to various individuals. In a hybrid mode of operation, some of the information can be public or transparently seen while other information will be kept obfuscated or private. In some cases, a marker can be used to designate the data access level. A marker could be something which shows who the user is to an auditor, election official, controller, or the like and could be a number like citizen 1, or customer 200. In some embodiments, a codex may be used which could be controlled by the system which would detect, and automatically scramble, the identity of the user so no one would know who the user is thus keeping the identity private. Only the persons responsible for the auditing or administering the blockchain would be able to decode or otherwise figure out who the accountable party is. In some embodiments, the codex would never provide this information unless it needed to be audited and accounted for.

In some embodiments, an auditing functionality can be integrated into a user interface that would give a user (e.g., with the click of a virtual button) the ability to allow all information or some information (e.g., column, format, section, etc.) to be set to private, public, and limited access. Some embodiments provide a real-time monitoring/auditing function which will show and allow a user to double or triple check what is kept private. In some embodiments, a password, password with two-party authenticator, three-party authenticator, multiple signature, or the like would be a part of a decentralized application (DApp) powered by the blockchain that would enable a user to submit, add or attach information going into a blockchain. In some embodiments, this information can be set up in a decentralized manner so information can automatically be inserted and tested and monitored on a decentralized network in real-time so that information is not leaked out or hacked or seen by parties that are not permitted.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
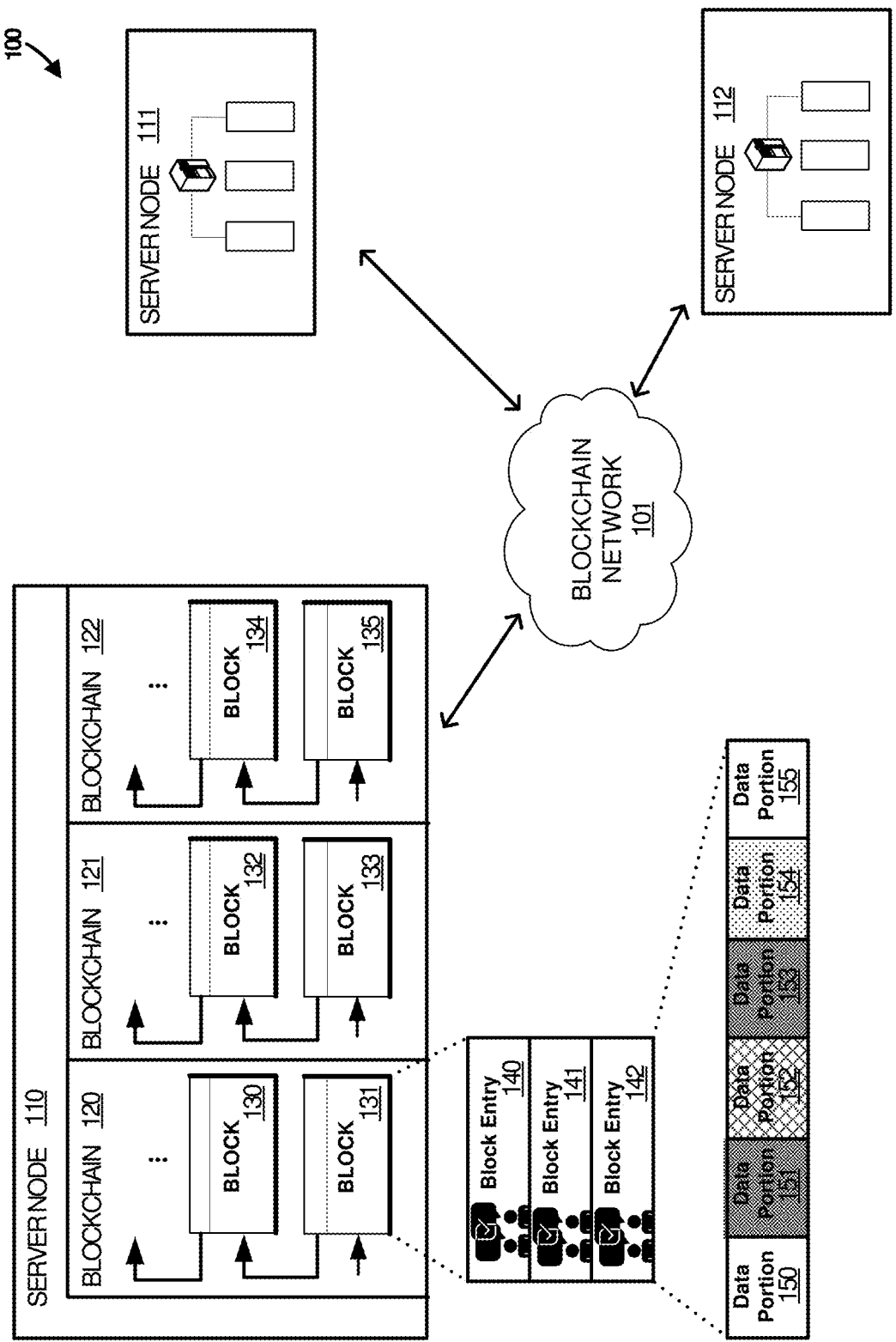
FIG. 1 illustrates an operational architecture for implementing an enhanced application to generate a customized view of restricted transactions recorded into a blockchain.

Blockchains have become a commonplace in generating a blockchain of data and sharing the data among users in a distributed network. Unlike previous database structures, the blockchain database is maintained by a multitude of independent nodes spread across a large distributed network of nodes. A public blockchain is a digital ledger that is open to any user to enter and record data (also referred to herein as transactions or block entries) into a block of the blockchain. When a transaction is recorded into the blockchain database, it is very difficult, if not impossible, to change or remove the transaction data from the database since the data is stored in more than one node in the distributed network. Therefore, data is added into the blockchain database by multiple users and changing the recorded data by adding, editing, or removing data would require a majority of the users or a master controller supervising changes and a cosigner (e.g., manager and employee, auditor and pit boss, etc.) to agree to the change.

Additionally, each block contains the data, the hash of the current block, and the hash of the previous block. The blockchain may also store additional details about the transaction in the block, such as the username initiating the transaction, other usernames of parties associated with the transaction, a timestamp, executable code, among other information that relates to the transaction. The hash identifies the block and the transaction data stored within the block. The hash is unique from all other hashes and changes whenever a change is made to the block. Since each block contains the hash of the previous block, the blocks form what is known as a blockchain. Any tampering with a block will cause a change in the hash of that block. Therefore, all other blocks in the blockchain will become invalid since they no longer contain a valid hash of the previous block.

While it may be possible to change the hash of each subsequent block in the blockchain, it would be nearly impossible to change each blockchain stored on each node in the distributed network, for both private and public networks. This combination of storing previous hashes to form the blockchain and distributing a full copy of the blockchain to each node in the distributed network (private, permissive, and public) creates a system of trust amongst users and the stored transactions in the network, especially when users are not familiar with one another (e.g., in a public network).

Examples of the present disclosure describe a system, process, and application for generating a customized view of a blockchain transaction. A blockchain of block entries requested by a plurality of users from user devices is maintained in a distributed network of nodes. The block entries each comprise a plurality of data portions that are each associated with an access level. A request to view one or more data portions of a block entry is received which may include an access code (e.g., hash, private key, biometric data, password, PIN, etc.) associated with at least one access level. The access code in the request is evaluated with the blockchain of block entries to identify one or more data portions associated with the access level. A customized view of the block entry is generated which includes the one or more data portions associated with the access level. In some embodiments, the portions of the data stored in the block chain may be individually encrypted. As such, depending on the level of access associated with the access code, decryption of only a portion of the data may be authorized or available while other portions would remain private or otherwise secured from view.

A technical effect that may be appreciated from the present discussion is the increased efficiency in identifying entry data that a user is authorized to access (e.g., financial records in a banking institution, a customer/supplier tracking inventory, compliance data for a gaming regulation committee, classified documents from a corporation or governmental or semi-governmental agency, personally identifying information (PII), health records for a medical institution, Protected Critical Infrastructure Information (PCII), data needed for a government auditor/inspector, and the like) and providing a customized view of the data that was recorded in the blockchain transaction. Some of the embodiments described herein also improve security by only allowing access to the user if the user has authorization to access the portion of data from the blockchain entry. In addition, some embodiments can provide an immutable log showing when and who accessed various data. In addition, in some embodiments, automatic review (e.g., by an artificial intelligence or machine learning engine) can occur to detect specific events (e.g., insider trading, money laundering, cheating, voter fraud, etc.).

More specifically, one implementation may provide a non-routine process of generating a customized view of a banking transaction that limits user sensitive information (e.g., Anti-Money Laundering (AML) or Know Your Customer (KYC) policy documents, (ADD) account numbers, account balances, account statements), but allows an external banking institution or user to verify that an account has available funds for a transaction. Another scenario provides a non-routine process of auditing a transaction in the blockchain while not enabling an auditor to view a full version of the transaction. For example, the Internal Revenue Service (IRS) may require an audit of all monetary transactions performed within the previous tax year. However, the company being audited may not be required to provide a full list of customer names and addresses for each transaction. By providing a customized view of the transaction, the IRS may have confidence in the accuracy of the transaction amounts and the company may maintain anonymity of its customers.

An additional technical effect of the present discussion may be appreciated in the gaming regulation industry. For example, one implementation described herein provides a non-routine process of viewing the outcome of a gaming bet while concealing a betting amount. This may be useful when monitoring a gaming community for advantage players (e.g., card counters, etc.) while allowing the players to maintain privacy of their money pot. In another example, a gaming committee may require a customized view of a transaction to view some PII about each player (e.g., verification that each player is of a legal age to gamble, verification that each player has not been blacklisted, player handles/nicknames) but not enable other PII to be viewable (e.g., credit card numbers used to buy into the game, legal names of each player, players' addresses, location of user, etc.).

Another example may include the Nevada Gaming Commission requiring disclosure documents of previous business relationships, employment history, criminal records, and financial stability from an applicant seeking a license for a gaming establishment. However, the applicant may not be required to provide expunged records of criminal behavior. Therefore, the view of the documents would be customized to display only those portions of the documents required by the Nevada Gaming Commission and omit, redact, or otherwise obfuscate data that is not deemed relevant or needed for seeking the license.

In some embodiments, the system may ingest the private information and generate a publicly viewable score, rating, or other indicator that may be used in making a decision without disclosing the underlying confidential information. In some embodiments, the system can connect to additional public and private data sources to collected additional information. For example, public information like FBI reports, credit reports, background reports, and the like. This additional information can be stored in the blockchain as part of the record or profile of an individual. This could be done off of a social security number, driver's license, facial recognition or fingerprint as a second factor for verification. As such, once a person enters the casino and registers a card to play it is possible that data could be collected on who the person really is and that information would only be available to the casino, auditor and regulator to make sure the person is who the person says he is, is legal and allowed on property or able to play.

In yet another embodiment, a technical effect may be recognized for a non-routine process of tracking package deliveries and inventory transit. For example, one or more packages may be scanned at origin, then once again as the packages begin transit in one cargo unit. The transit company may want to allow a recipient of one of the packages to view data associated with their box but not allow the recipient to view all other data stored in the transaction associated with the other packages in the cargo unit. Therefore, a customized view of the transaction for the recipient user describing the location, departure time, and estimated arrival time for their package only would be enabled. Additional information associated with the product may also be collected and stored in a blockchain detailing product logistics, such as manufacturer, vendor, checkpoint location, checkpoint employee, quality control manager, testing center, as well as a chain of custody through the shipping process as well as individuals that accessed the cargo unit during its shipment. At any time or upon receipt, the receiving party may be enabled to see parts of this information but not all depending on the status of the recipient. For example, a gambling establishment or regulator may be able to view selective product information regarding manufactured dice along with a chain of custody to verify that the dice have not been tainted with while routed from the trusted dice manufacturer. This data may be displayed in a customized view.

Further, examples herein describe that the access code in the request with the blockchain of block entries may be evaluated by processing an encryption code to validate access to view the one or more data portions associated with the access level. In other examples, a pointer is also maintained for each of the plurality of data portions in the block entries indicating at least one published location for each of the plurality of data portions in the block entries. Further in this example, the customized view is generated by retrieving the one or more data portions associated with the access level using the pointer for each of the plurality of data portions in the block entries. The access of the portions of data require the use of a pin code, password, fingerprint, barcode, retinal scan, token, questionnaire, or any other type of access determination method including two-factor, multi-factor, or additional security authenticators.

In a further example, the blockchain of block entries requested by the plurality of users from the user devices is maintained by maintaining a separate block entry for the one or more data portions associated with each of the access levels. Further in this scenario, the access code in the request is validated to view the one or more block entry for the more or more data portions associated with each of the access levels. In some implementations, the blockchain of block entries requested by the plurality of users from the user devices is maintained by maintaining a separate blockchain for the one or more data portions associated with each of the access levels. Further in this implementation, the access code in the request is validated to view the one or more block entry for the more or more data portions associated with each of the access levels.

In some examples, the received request to view the one or more data portions of the block entry comprises an inventory tracking request. In other examples, the received request to view the one or more data portions of the block entry comprises a financial auditing request. In some scenarios, the received request to view the one or more data portions of the block entry comprises a gaming regulation request. In other scenarios, the access level associated with the one or more data portions of the block entry comprises at least one of a private access level, a permissive access level, and a public access level. However, in even further examples, the access level associated with the block entry comprises at least one of a private access level, a permissive access level, and a public access level.

While the present disclosure describes various embodiments, it should be appreciated that additional examples may be included for technical improvement in additional industries. Example industries may include defense and security, finance and insurance, retail (e.g., firearms), sales and licensing, medical records, accounting, shipping and logistics, drugs and pharmaceuticals, cannabis, oil and gas, energy and commodities, national security, and the like.

Figure 18:
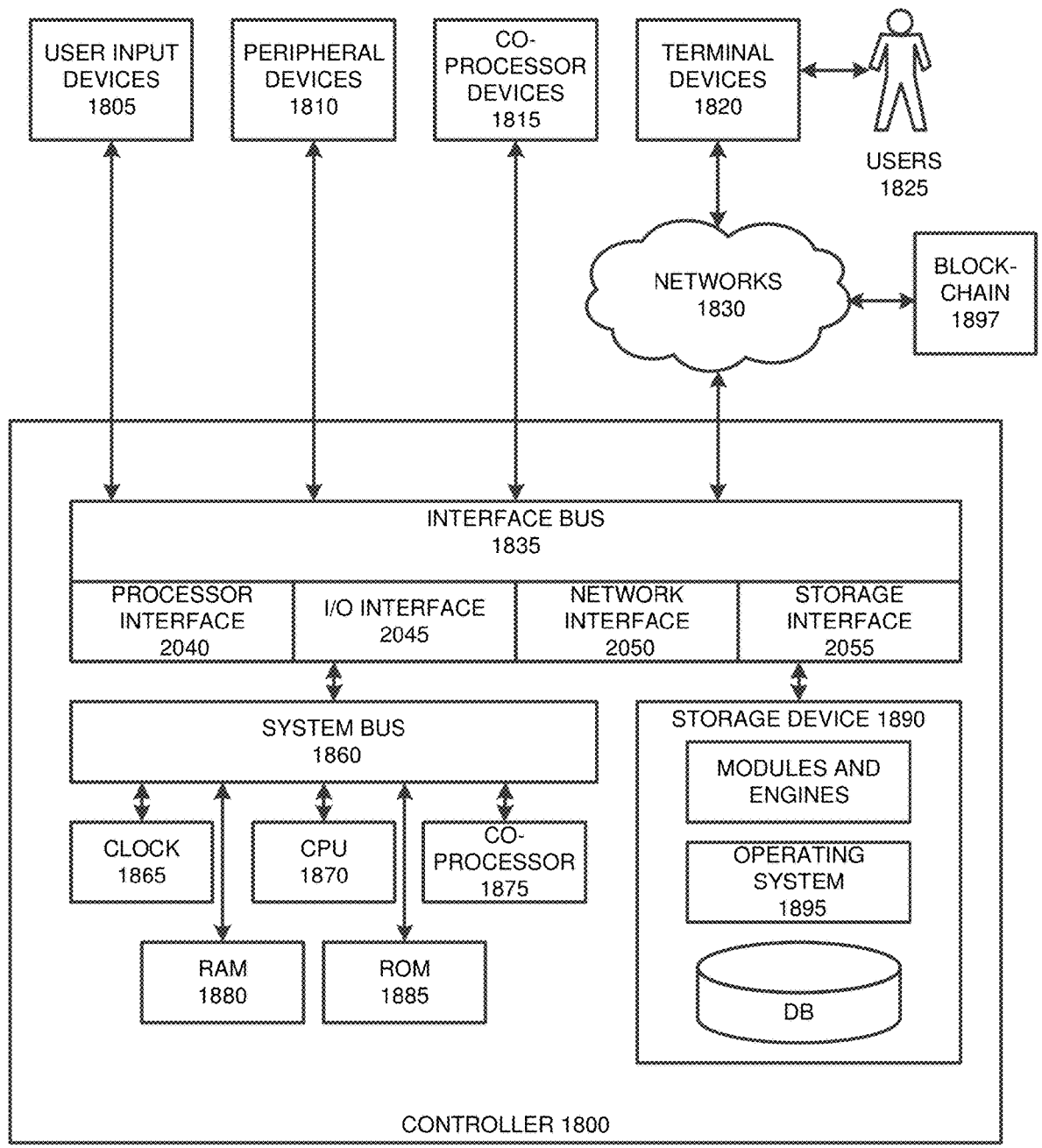
FIG. 18 illustrates a computing system suitable for implementing the technology disclosed herein, including any of the architectures, processes, operational scenarios, and operational sequences illustrated in the Figures and discussed below in the Technical Description.

Referring to the drawings, FIG. 1 illustrates an exemplary operational architecture 100 related to processing operations for management of an exemplary enhanced system with which aspects of the present disclosure may be practiced. Operational environment 100 includes blockchain network 101. Blockchain network 101 employs an access (e.g., view) customization process 200 in the context of authorizing a user to access (e.g., view) a portion of data in a blockchain entry based on the user's approved access level. Blockchain network 101 may include various hardware and software elements in a supporting architecture suitable for performing view customization process 200. One such representative architecture is illustrated in FIG. 18 with respect to controller 1800.

Server nodes 110-112 comprise one or more servers and devices capable of running a blockchain application. User devices interacting with server nodes 110-112 may include, but are not limited to, personal computers, mobile phones, handheld device, tablet computers, desktop computers, laptop computers, wearable computing devices, voting machines, gaming machines, electronic financial exchanges, security systems, or any other form factor, including any combination of computers or variations thereof.

Figure 2:
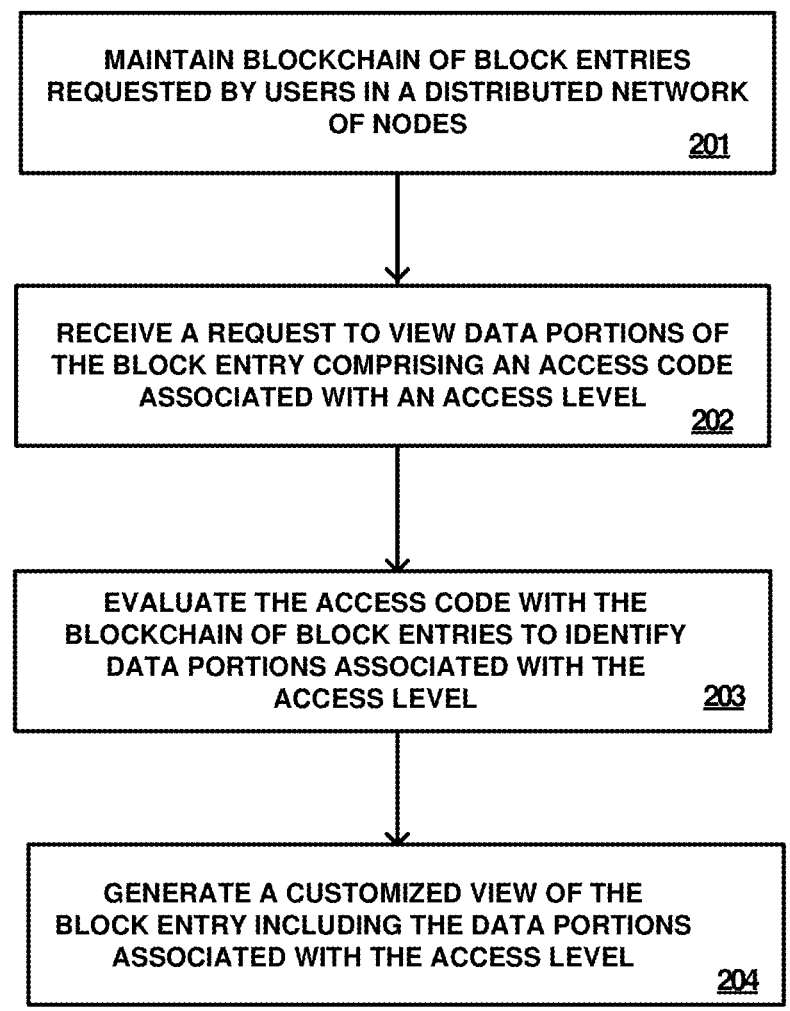
FIG. 2 illustrates a view customization process employed in implementations of an enhanced application to generate a customized view of restricted transactions recorded into a blockchain.

More particularly, FIG. 2 illustrates view customization process 200 which, as mentioned, may be employed by blockchain network 101 to generate a customized view of restricted transactions recorded into a blockchain as described herein. Some or all of the steps of view customization process 200 may be implemented in program instructions in the context of a component or components of the application used to carry out the customized view feature. The program instructions direct blockchain network 101 to operate as follows, referring parenthetically to the steps in FIG. 2 in the context of FIG. 1.

In operation, blockchain network 101 maintains blockchain 120 of block entries requested by a plurality of users from user devices, wherein the block entries each comprise a plurality of portions that are each associated with an access level (step 201). The blockchain database is maintained by a multitude of independent users spread across blockchain network 101 of server nodes 110-112. Blockchain 120 is a digital ledger that is open to any user (e.g., a public blockchain), a specific set of users (e.g., a private blockchain), or combination of private and public users (e.g., a hybrid blockchain) to enter and record data into block 130 of the blockchain. Blockchain 120 may be added by multiple users and recorded by multiple nodes 110-112 in the distributed network.

Block 130 includes block entries 140-142. Block entries 140-142 may include various types of data including gaming bets, inventory records, medical records, banking and financial records, smart contracts, and any other type of combination or variation thereof. For instance, the user may create block entry 140 by entering into a contract with another user and then storing the contract as block entry 140 in blockchain 120 on nodes 110-112 in the distributed network environment. As another example, electronic devices (e.g., electronic voting machines, electronic gaming or gambling machines and systems, auditing software running on one or more servers, end-user devices, and the like) may connect automatically to blockchain network and request data be added in block entries.

In order to add a new block entry with data portions, blockchain may use consensus protocols like proof of stake (PoS), or proof of work (PoW), delegated proof of stake (DPoS), or the like. For example, in PoW, in order for server node 110-112 to be elected as a leader to select the next block entry 140 to be added to the blockchain, a particular server node has to find a solution (typically by brute force) to a particular puzzle or mathematical problem. Once the solution is found, the server node publishes the solution to the other nodes for validation. When a consensus of the nodes agrees the solution is correct, the new block entry can be added to the blockchain. Examples of proof of work are SHA-256, Blake-256, CryptoNight, Quark, SHA-256, SHA-3, 4crypt, scrypt-jane, HEFTY1 or others or combinations thereof. In contrast, PoS is based on the involvement and value at risk (e.g., the stake) of the server node. DPoS is efficient variation of PoS that provides a high level of scalability by limiting the number of validators on the network to set of delegates (e.g., voters) to vote on whether to add an entry to the blockchain.

Block entries 140-142 also each include data portions 150-155. Data portions 150-155 comprise the components which make up each of block entries 140-142 and may be broken into segments based on a user request or a transaction format (both standardized and customized). For example, a portion of data from a transaction may be allocated as private if a user flags the portion of data as confidential. The portion of data may also be allocated as private if the data is of a category which was previously allocated as private. For example, a user may categorize all credit card numbers as private. Conversely, a portion of data may also be allocated as public or permissive by the user. In some implementations, the portion of data may only be designated as accessible (e.g., viewable) to a receiving user if the originating or controlling user provides permission (e.g., originating party of a transaction allocates the block entry and all data portions as private and ability to view a portion of data requires consent via signature terms and condition form). This user consent feature may be included in an access platform allowing users to provide consent through a user consent section.

Some embodiments of the present technology modify the traditional protocols and workflow for adding data to the blockchain. For example, in some embodiments, the server node 110-112 is required to identify or classify portions of the data into one or more categories. This can be done, for example, using artificial intelligence or machine learning to identify and otherwise classify the data into one or more categories (e.g., PII such as names, e-mail address, social security number, etc.). In some embodiments, a decentralized application (DApp) may be responsible for the initial sorting and categorization of the data. When a block entry 140-142 is added, the initial line of the entry that typically includes the hash of previous blocks and a time stamp may be amended to include information regarding the data categories within the entry, access level for each data portion, access restrictions, or the like. For example, some embodiments may create an index and/or access level information that is stored within the block entry. As such, when the data is later retrieved it can easily be identified or associated with an appropriate access level. Still yet, in some embodiments, the server node responsible for adding the data may organize the data and set different encryption levels for the different data portions 150-155. For instance, a first category of PII data including social security numbers may be set with a higher level (e.g., more difficult to crack) of encryption as compared to at least a second PII data category including individual's names which may set with a lower level of encryption. In other embodiments, a middleware may be used (e.g., on a data platform sitting between the blockchain network and the connecting devices) to decrypt encrypted data stored on the blockchain, classify information, and enforce access level permissions thereby creating the customized view.

In some scenarios, the user may set a default setting allocating all of the data in the transaction as public and selectively allocate individual segments of data as private, and vice versa. Likewise, a portion of the data may also be allocated as permissive where the data is not available to the general public but may be accessible to users of various groups, such as auditing committee members, law enforcement officers, government regulation personnel, medical staff, and the like. In other examples, blockchain 120 may include default rules to allocate portions of data as private, permissive, or public.

For example, blockchain 120 may determine that any social security number should be automatically set to private access. While several examples and embodiments included herein describe the main access levels to be categorized as private, permissive, or public, it should be understood that any number of access level categories may be recognized within the scope of the present disclosure. Moreover, the status of the access levels may automatically change or be updated based on detection of certain events. For example, all data regarding a deal may remain private for a period of time at which point the system may change the access level to public for some or all of the related data.

In a next operation, blockchain network 101 receives a request to view one or more data portions 150-155 of block entry 140 from a user which includes an access code associated with at least one access level (step 202). The request to view may be initiated by a user who is a party to the transaction stored in block entry 140, such as one participant in a gaming bet. The user may also be a user merely having interest in the transaction but not directly involved with the transaction, such as a tax auditor verifying income data, a transfer agent or third party financial custodian holdings stocks and bonds, a servicer that collects debt payments on behalf of a lender or a stockholder viewing recent company dividend transactions.

In a next operation, the access code is evaluated with the blockchain of block entries to identify one or more data portions associated with the access level (step 203). The access code may be designated to the user based on a user status, such as a government employee, package delivery employee, bank manager, etc. The access code may be determined based on an encrypted code (e.g., a private key or hash) given to the user which is associated with an access level or data portion. The access code may further be validated based on a password, signature, fingerprint, barcode, processing chip, questionnaire, biometric, token, and any other method which may enable a user to verify authorization to access data portions 150-155 associated with an access level. In some example scenarios, data portions 150-155 may be separated into different blockchains or block entries based on their associated access level. In this scenario, access code 150 may be required to access the blockchain or block entry to view the portion of data associated with the access level.

In a final operation, a customized view of the block entry is generated which includes one or more data portions 150-155 associated with the access level (step 204). The customized view may be generated by a data access platform. The customized view may be modified to incorporate only those data portions associated with the validated access level or may include all data portions 150-155 with unauthorized data portions blacked out from the record view. The customized view may be surfaced in a blockchain application (e.g., a DApp) on a user device, transferred to a user in the form of a record message, or displayed in any other manner to a user or user group.

In accordance with various embodiments, the addition of data to the blockchain, security level screening, data categorization, access level assignments, auditing and/or other functionality may all be done autonomously. For example, as a user enters a casino, data can be automatically collected and added to the blockchain from various systems (e.g., surveillance cameras, parking garage cameras, loyalty card systems, room access systems, entertainment databases, and the like). Given the volume of data, artificial intelligence and/or machine learning engines (e.g., using support vector machines, artificial neural networks, Bayesian networks, supervised learning, unsupervised learning, and/or other techniques) can be used to identify, associate and classify relevant data that can be added to a blockchain. The data itself may be indexed for searching and/or future ingestion. In other embodiments, the data may be segmented and added to a profile of a player. Since various portions of the data can be assigned different access levels, the person requesting the data may be automatically served only the portions of data that are appropriate for their access level. Similarly, the data may be automatically reviewed or audited to identify violations (e.g., gambling rule violations, cheating, collusion, people banned from gambling, etc.).

Similar to casino monitoring, various embodiments of the present technology can be applied to verticals that can review data automatically without humans overseeing the review. For example, some embodiments may interface with secure data sets (e.g., stored on a private blockchain) to gain biometrics or data about an individual. As such, government agencies (e.g., ICE or Department of Homeland Security) can provide data that can be used to identify individuals and make determinations whether they should be granted to access to particular data, activities, and/or locations. For example, various embodiments of the system may be used to screen individuals for a trusted traveler program. As the individual enters the airport, for example, surveillance cameras can collect video data which can be ingested by artificial intelligence or machine learning engines. This data can be linked with various PII, license plates, travel records, biometric data, and the like to initially identify the individual and determine if a violation is in progress, prescreen the person (e.g., for faster screening), or determine whether the user can be denied entry to the airplane or other travel method. In some embodiments, each person may have their driver's license scanned and the system can automatically classify the identification as legitimate or a fraud and search for records in the blockchain to assist in making decisions.

Figure 3:
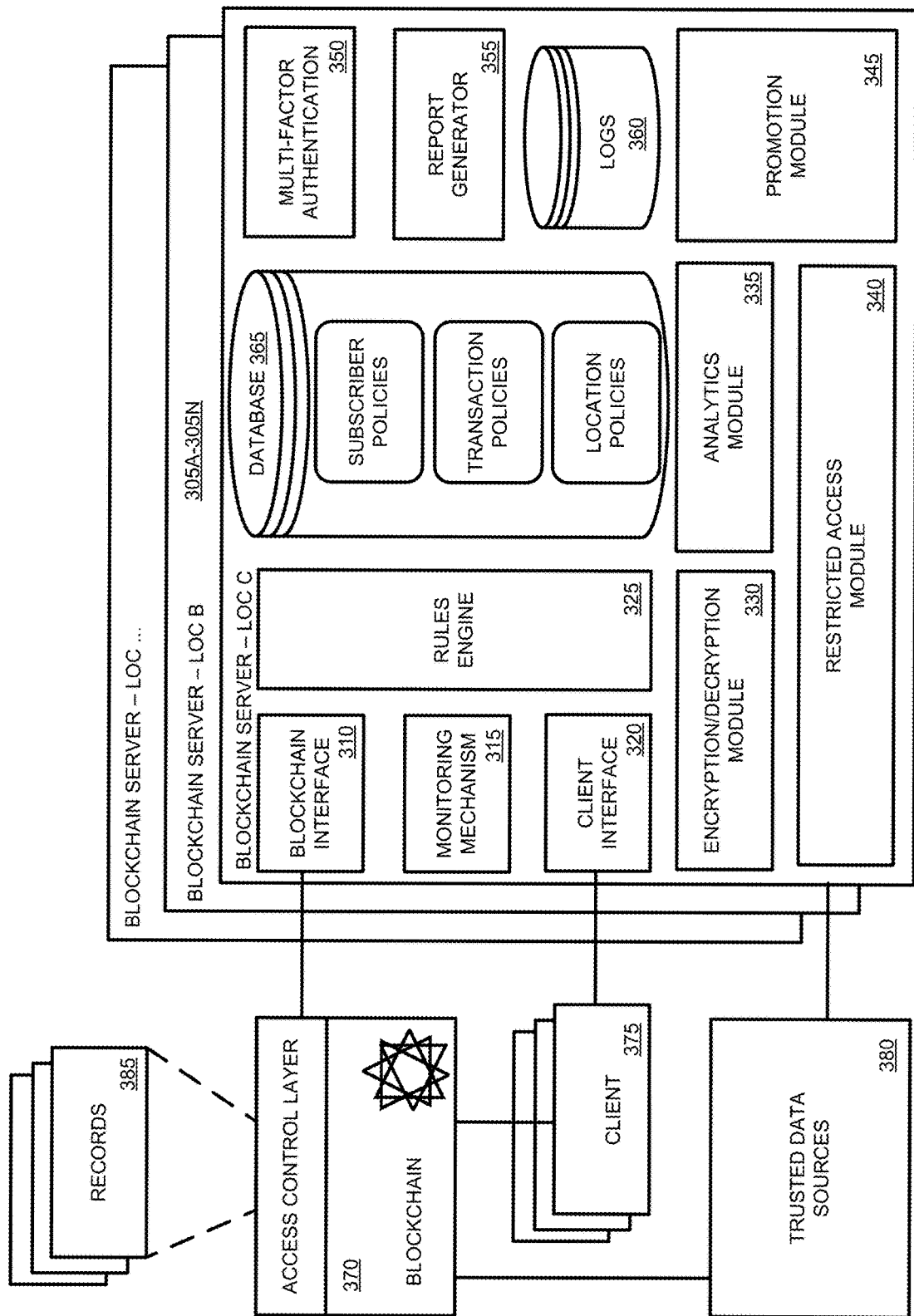
FIG. 3 illustrates various components of the distributed ledger architecture in an implementation to generate a customized view of restricted transactions recorded into a blockchain.

FIG. 3 illustrates various components of a blockchain data platform utilizing a distributed ledger architecture according to various embodiments of the present technology. As illustrated in FIG. 3, the blockchain data platform may use one or more servers 305A-305N. Each server can include blockchain interface 310, monitoring mechanism 315, client interface 320, rules engine 325, encryption/decryption module 330, analytics module 335, event module 340, multifactor authentication module 350, report generator 355, and/or databases 360 and/or 365 for storing logs, subscriber policies, transaction policies, location policies, and/or the like. In addition, blockchain servers 305A-205N can connect with blockchain 370, clients 375, trusted data sources 380, and/or records 385.

Each of these modules, components, or databases can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, databases, and/or components. Still yet, some embodiments may incorporate two or more of these modules and components into a single module and/or associate a portion of the functionality of one or more of these modules with a different module. For example, in one embodiment, rules engine 325 and event module 340 can be combined into a single module for identifying and enforcing various rules and event policies on a user terminal.

Clients 375 may connect to one of blockchain servers 305A-305N using client interface 320. Clients 375 may be able to download (or have preinstalled) firmware or software from blockchain servers 305A-305N that allows clients 375 to enter and view block entries (or selected portions thereof). The block entries may comprise a variety of transactions (e.g., financial transactions, gaming bets, medical records, inventory tracking, etc.) and a variety of access levels (private, permissive, public, etc.). In some embodiments, blockchain servers 305A-305N process an encryption code to validate access to view the one or more portions of each transaction.

In some embodiments blockchain servers 305A-305N may maintain a pointer for each of the plurality of portions in the block entries indicating at least one published location for each of the plurality of portions in the block entries. The customized view of the block entry may then be generated by retrieving the portions associated with the access level using the pointer for each of the portions in the block entries. In other embodiments, blockchain servers 305A-305N may maintain a separate block entry for the data portions associated with each of the access levels. Blockchain servers 305A-305N may evaluate the access code in the request with the block entries of blockchain 370 to identify the data portions associated with the access level. In some scenarios, blockchain servers 305A-305N may maintain a separate blockchain for the data portions associated with each of the access levels. Blockchain servers 305A-305N may then evaluate the access code in the request with blockchain 370 to identify the data portions associated with the access level.

In some examples, information stored in blockchain 370 may be encrypted using encryption/decryption module 330. In some embodiments, encryption/decryption module 330 may use various non-homomorphic encryption and/or homomorphic encryption. While the non-homomorphic encryption may provide stronger security properties, the use of homomorphic encryption would allow computation on encoded data without decryption. As a result, various components of the gaming system can interact and operate on portions of the data without exposure of sensitive data.

Monitoring mechanism 315 can monitor transactions and user activities. This can include receiving information from external sources such as, but not limited to, clients 375, video surveillance systems, loyalty card systems, key engines, biometric sensors, and other external systems. In some embodiments, multifactor authentication may be used before allowing a user to enter or to access a monetary transaction, medical record, gaming bet, inventory activity log, and the like. For example, when a patient accesses a medical record, multifactor authentication module 350 may be used to require various types of authentications (e.g., personal pin, biometric, token, etc.). Rules engine 325 can superimpose rules on the transaction interfaces being presented on clients 375. These rules can be based various policies (e.g., subscriber policies, transaction policies, location policies, etc.) stored in database 365. Analytics module 335 can generate various analytics about layers, clients, games, medical diagnosis, payrolls, package deliveries, payouts, accounts, and/or other system components or activity. This information can be used by report generator 355 to create customized view of the transactions.

Restricted access module 340 can be used to create customized access requirements for different portions of data in each transaction and for different users/user types. The rewards may be stored within blockchain 370 in records 385. The access requirements may be generated by a user entering the transaction, determined based on previously designated user preferences, or by policies required by other parties (e.g., permissive access for medical records required by the Health Insurance Portability and Accountability Act of 1996 (HIPAA), state laws for minimum age to gamble, etc.). A customized view of records may be presented based on those access policies. Databases 360 and/or 365 can be used for storing logs, subscriber policies, transaction policies, location policies, and/or the like. These may be local stores of data retrieved from records 385 associated with blockchain 370. In addition, servers 305A-305N and blockchain 370 can connect with trusted data sources 380 for validation of external events (e.g., outcome of sporting events, reconciliation of vender/buyer journal entries, etc.) or information (e.g., status of a security clearance) that are needed to determine data stored within records 385.

Figure 4:
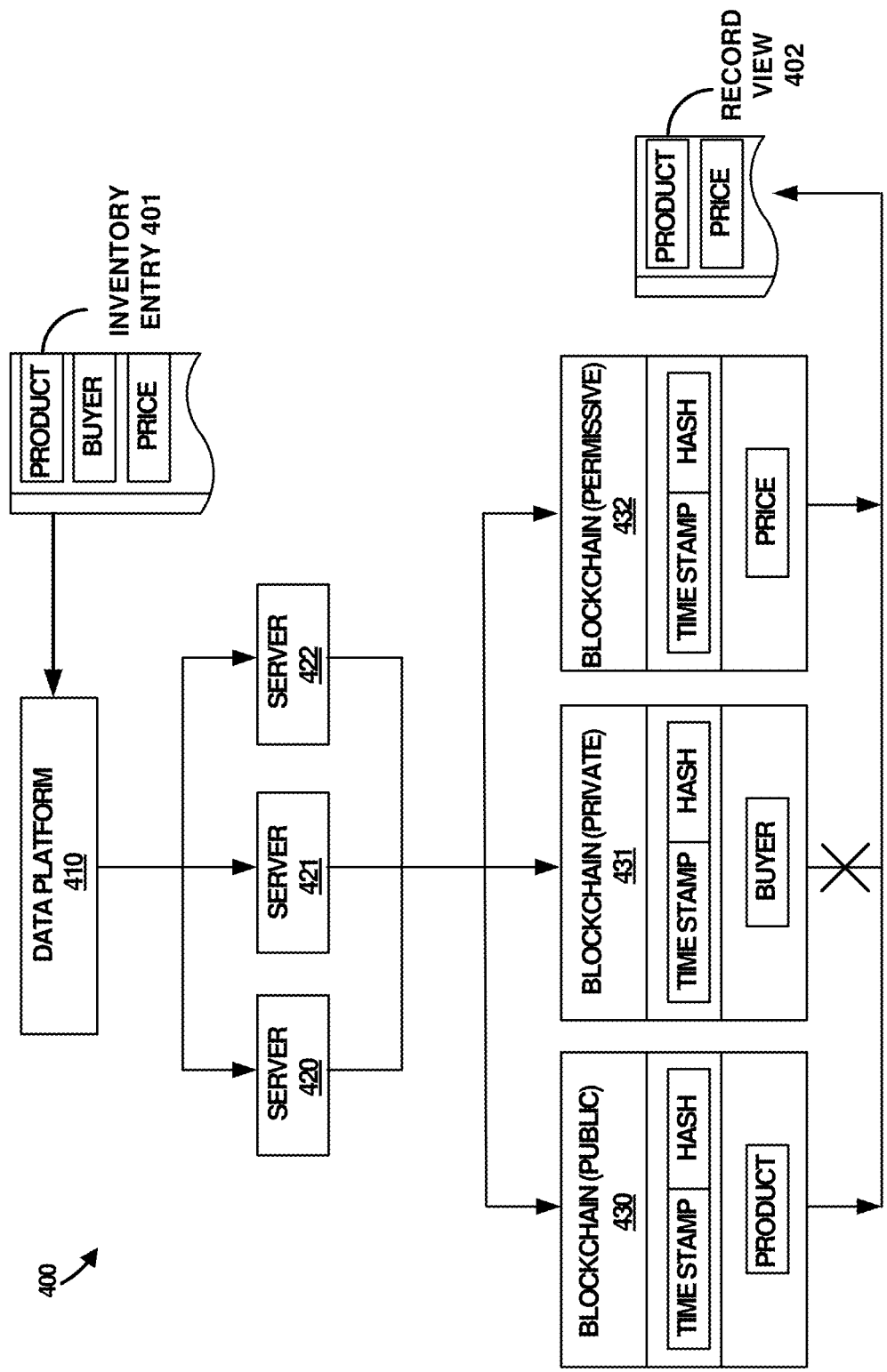
FIG. 4 illustrates a block diagram in an implementation of an enhanced application to generate a customized view of restricted transactions recorded into a blockchain.

FIG. 4 illustrates block diagram 400 in an implementation of an enhanced application to generate a customized view of restricted transactions recorded into a blockchain. Block diagram 400 includes inventory block entry 401, data platform 410, servers 420-422, blockchains 430-432, and record 402.

Block entry 401 is representative of any data transaction that will be permanently recorded into the blockchain. Block entry 401 is subsequently processed by miners and added to a block at the end of the blockchain by data platform 410. Block entry 401 further comprises portions of data which have been represented herein by Product, Buyer, and Price. It should be noted that while each of the data portions is represented separately, the portions of data are part of one transaction represented by block entry 401. Block entry 401 may comprise any transaction or contract which has been executed and recorded in a distributed ledger platform environment. In this example, block entry 401 may comprise a purchase order for inventory.

Data platform 410 represents any computing system or systems capable of hosting a blockchain application, of which controller 1800 in FIG. 18 is representative. Data platform 410 provides a secure distributed ledger system for recording transactions into the blockchains. Data platform 410 may be implemented across a multitude of distributed network nodes which may be accessed by a variety of users, such as tax auditors, financial institutions, gaming regulation committees, customers, company employees, and the like.

Data platform 410 can also include servers 420-422. Servers 420-422 may be representative of any computing system or systems with which the distributed network nodes may communicate. Examples include other devices having corresponding applications or services installed thereon, such that an operating user of a user device may be able to transfer a transaction to be added to a blockchain and distributed amongst the network nodes of the distributed network. Examples include media servers, web servers, and other types of end-points that may transmit transaction data to or receive transaction data from user devices and network nodes. In some embodiments, data platform can dynamically select which servers 420-422 are authorized to store the data. For example, companies or governments may have geographical restrictions, encryption standards, network security standards, or other restrictions on the server nodes on which the blockchain is stored. Data platform 410 can therefore manage the logistics of dynamically selected servers based on these restrictions. For example, if a particular server is deemed to be under attack or hacked, then data platform 410 can dynamically remove that server from the blockchain network and consider adding one or more additional servers if needed. As such, each owner of the data can set selection criteria for where the data should be stored and the minimum data security and/or other IT standards needed for that server group.

Block diagram 400 further includes blockchains 430-432. Blockchains 430-432 can contain a continuously growing list of records, called blocks, which are linked and secured using cryptography. Each of the block in blockchains 430-432 contains a timestamp and a hash. The hash includes both a cryptographic hash of the current block and a cryptographic hash of the previous block in the blockchain. Each block also contains data associated with a block entry. In this example scenario, each portion of data (Product, Buyer, and Price) have been separately recorded into a different block and in a separate blockchain 430-432.

Additionally, each of blockchains 430-432 is associated with a separate access level. For example, blockchain 430 is a public access blockchain which allows any user interacting with the distributed ledger to view the blocks and data portions stored within each block. A public user may be any user interested in viewing the transaction in blockchain 430 and no privacy exists for this portion of data. Conversely, blockchain 431 is a private blockchain which data portions may only be accessed and viewed by authorized users, such as internal company personnel. In this example scenario, Buyer has been separately stored on blockchain 431 and is private from all users interacting in the blockchain network except those with exclusive access to the data, such as managers within a company initiating the transaction. Blockchain 432 is a permissive blockchain meaning that a limited set of parties may view the data portions recorded in the block but not all users. Price has been stored within blockchain 432 and may be viewed by parties who are allowed access to the data, such as auditors or controllers.

Record 402 is illustrative of what a user may view when requesting to view the transaction data stored in from block entry 401. Record 402 may contain all or none of the data portions originally entered in block entry 401 and is generated based on the authorization provided by the requesting user and access level each portion of data is associated with.

Figure 5:
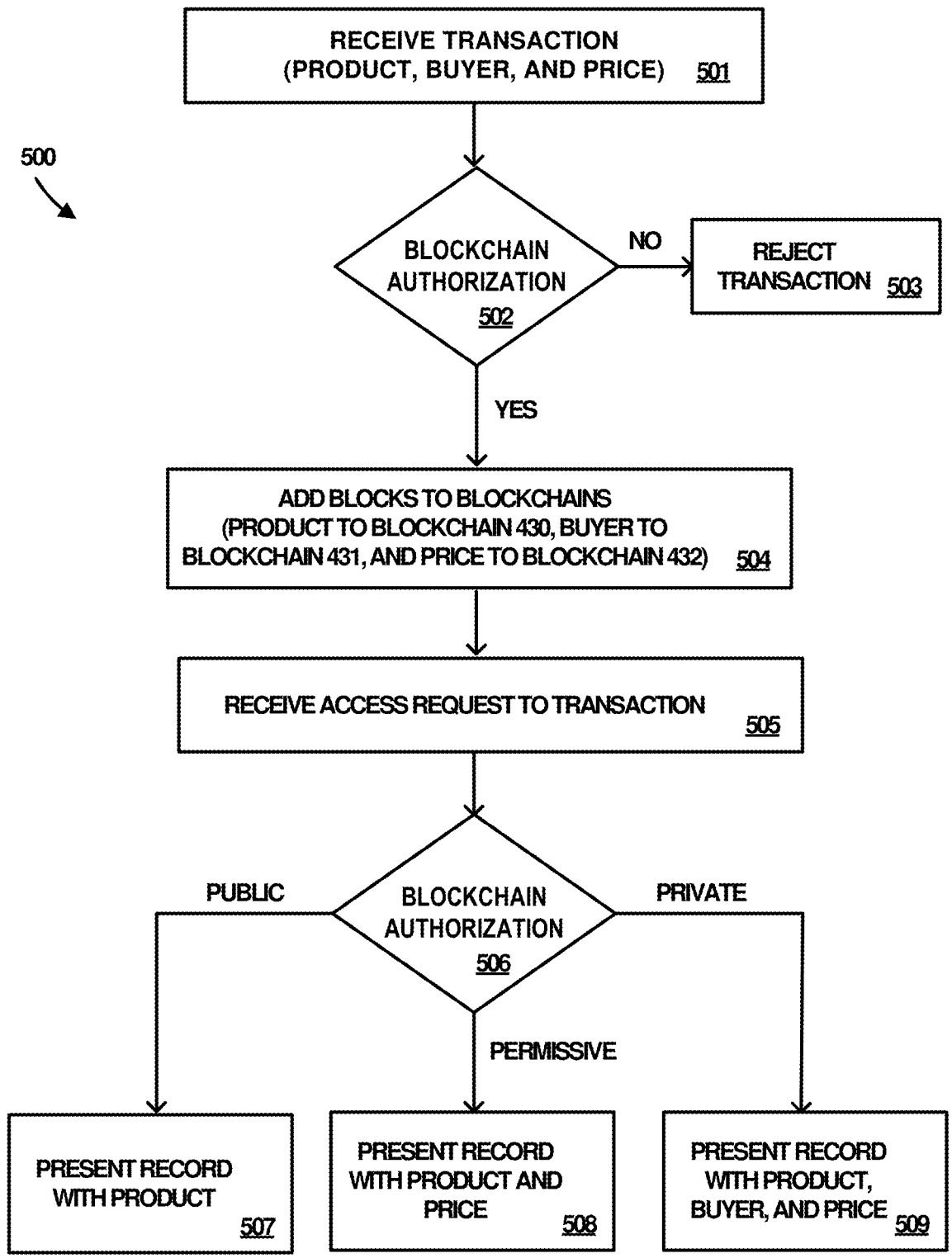
FIG. 5 illustrates a flow diagram in an implementation of an enhanced application to generate a customized view of restricted transactions recorded into a blockchain.

FIG. 5 illustrates a flow diagram in an implementation to generate a customized view of restricted transactions recorded into a blockchain. Some or all of the steps of view customization process 500 may be implemented in program instructions in the context of a component or components of the application used to carry out the customized view feature.

In operation, data platform 410 receives block entry 401 which is to be maintained in blocks of blockchains 430-432 (step 501). Block entry 401 is requested by a user from a user device in the distributed network of nodes and contains the data portions. Data platform 410 then authorizes the entry (e.g., miners validate the hash in the block) (step 502). If the block is not validated, the transaction (block entry 401) is rejected (step 503). However, if the block is accepted, each of the portions of data is evaluated for an access level and added to a block in each of blockchains 430-432 based on the identified access level (step 504).

In a next operation, data platform 410 receives a request to view one or more data portions of a block entry wherein the request comprises an access code associated with at least one access level (step 505). The access code may be associated with a public, permissive, or private access level. Data platform 410 then evaluates the access code in the request with each of blockchains 430-432 maintaining each of the separate block records for each of the data portions (step 506). If the access code associated with the requesting user is determined to be public, a customized view (e.g., record 402) will be generated for the requesting user indicating only Product from block entry 401 (step 507). If the access code associated with the requesting user is determined to be permissive, a customized view will be generated for the requesting user indicating Product and Price from block entry 401 (step 508). If the access code associated with the requesting user is determined to be private, a customized view will be generated for the requesting user indicating all portions of the data from block entry 401 (i.e., Product, Buyer, and Price) (step 509).

Another implementation for flow diagram 500 may be in the context of a gambling validation process. For example, a user placing a bet on a large threshold win may require approval from casino managers. In this example scenario, access to the user's data in a blockchain may be required when a payout of the bet occurs to ensure that the bet was approved for the user by the casino manager.

Figure 6:
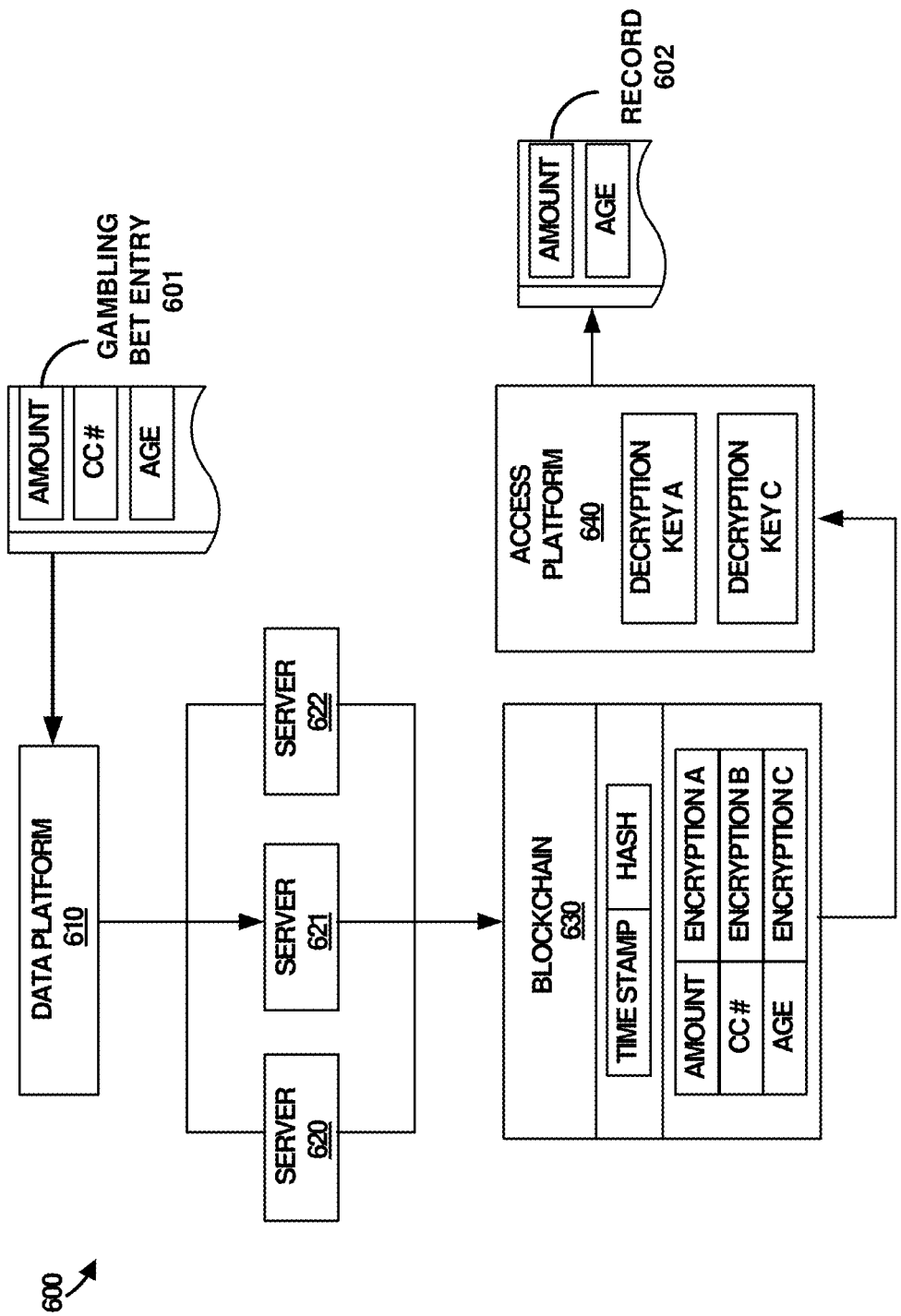
FIG. 6 illustrates a block diagram in an implementation of an enhanced application to generate a customized view of restricted transactions recorded into a blockchain.

FIG. 6 illustrates a block diagram in an alternative implementation of an enhanced application to generate a customized view of restricted transactions recorded into a blockchain. Block diagram 600 includes gaming bet block entry 601, data platform 610, servers 620-622, blockchain 630, access platform 640, and record 602.

Block entry 601 is representative of any data transaction that will be permanently recorded into the blockchain. Block entry 601 is subsequently processed by miners and added to a block at the end of the blockchain by data platform 610. Block entry 601 further comprises portions of data which have been represented herein by a Bet Amount, Credit Card Number, and Age. It should be noted that while each of the data portions is represented separately, the portions of data are part of one transaction represented by block entry 601. Block entry 601 may comprise any transaction or contract which has been executed and recorded in a distributed ledger platform environment. However, in this example, block entry 601 comprises a gambling bet. It should also be noted that although requesting users, such as a third-party observer who is not a direct participant of the bet, may be able to view some data of blockchain 630, an access code may be required to view block entry 601. The access code may be in the form of a biometric validation.

Data platform 610 represents any computing system or systems capable of hosting a blockchain application, of which controller 1800 in FIG. 18 is representative. Data platform 610 provides a secure distributed ledger system for recording transactions into the blockchains. Data platform 610 may be implemented across a multitude of distributed network nodes which may be accessed by a variety of users, such as auditors, financial institutions, gaming regulation committees, customers, company employees, and the like.

Data platform 610 also includes servers 620-622. Servers 620-622 may be representative of any computing system or systems with which the distributed network nodes may communicate. Examples include other devices having corresponding applications or services installed thereon, such that an operating user of a user device may be able to transfer a transaction to be added to a blockchain and distributed amongst the network nodes of the distributed network. Examples include media servers, web servers, and other types of end-points that may transmit transaction data to or receive transaction data from user devices and network nodes.

Block diagram 600 further includes blockchain 630. Blockchain 630 contains a continuously growing list of records, called blocks, which are linked and secured using cryptography. Each of the blocks in blockchain 630 contains a timestamp and a hash. The hash includes both a cryptographic hash of the current block and a cryptographic hash of the previous block in the blockchain. Each block also contains data associated with a block entry. In this example scenario, each portion of data (Bet Amount, Credit Card Number, and Age) have been recorded into blockchain 630 with a separate encryption code.

Additionally, each of the encryption codes associated with each of the data portions in blockchain 630 is associated with a separate access level. For example, Bet Amount is associated with a public access encryption code which allows any user interacting with the distributed ledger to view the portion of data in the block. A public user may be any user interested in viewing the Bet Amount and no privacy exists for this portion of data. Conversely, Credit Card Number is associated with a private encryption code which may only be accessed and viewed by authorized users, such as the internal accounting department. Age is associated with a permissive encryption code which may be viewed by a limited set of parties but not all users. For example, Age may be required to be viewed by the gaming committee to ensure that all players are of a legal age to place the gambling bet. However, other players or observers of the bets may not be able to view the age of each player.

Access platform 640 represents any computing system or systems, or other suitable means capable of validating user request(s) to access blockchain entry data, of which controller 1800 in FIG. 18 is a representative means. Where such means for validating user request(s) to access blockchain entry data is embodied in access platform 640, a secure encryption mediator may be provided between the portions of data recorded in blockchain 630 and the generation of record 602 for a requesting user. Access platform 640 may be implemented across a multitude of distributed network nodes which may be accessed by a variety of users, such as tax auditors, financial institutions, gaming regulation committees, customers, company employees, and the like. Record 602 is illustrative of what a user may view when requesting to view the transaction data stored in from block entry 601. Record 602 may contain all or none of the data portions originally entered in block entry 601 and is generated based on the authorization provided by the requesting user and access level each portion of data is associated with.

Figure 7:
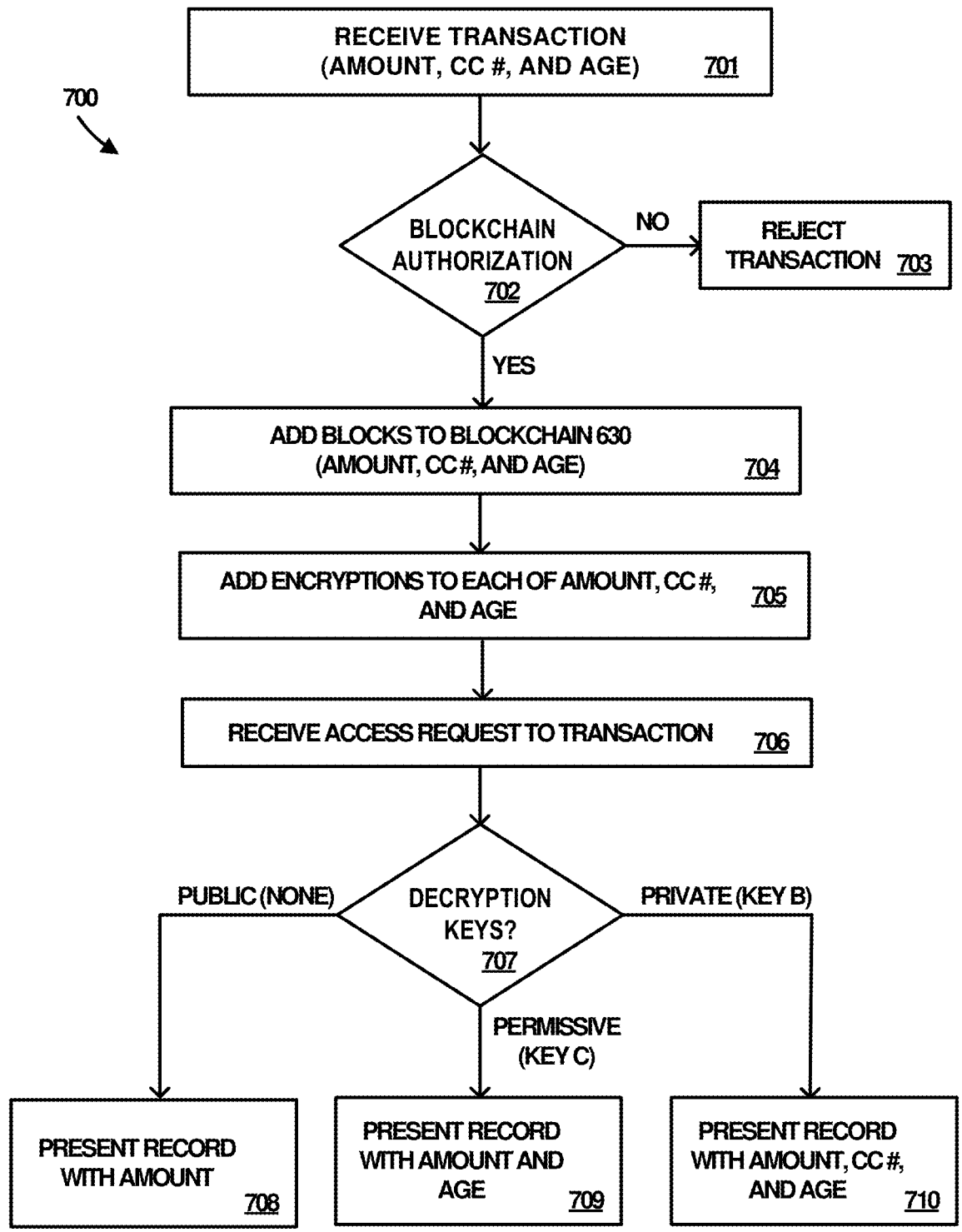
FIG. 7 illustrates a flow diagram in an implementation of an enhanced application to generate a customized view of restricted transactions recorded into a blockchain.

FIG. 7 illustrates a flow diagram in an implementation to generate a customized view of restricted transactions recorded into a blockchain. Some or all of the steps of view customization process 700 may be implemented in program instructions in the context of a component or components of the application used to carry out the customized view feature.

In operation, data platform 610 receives block entry 601 which is to be maintained in blocks of blockchain 630 (step 701). Block entry 601 is requested by a user from a user device in the distributed network of nodes and contains the data portions. Data platform 610 then authorizes the entry (e.g., miners validate the hash in the block) (step 702). If the block is not validated, the transaction (block entry 601) is rejected (step 703). However, if the block is accepted, each of the portions of data are evaluated for an access level and added to blockchain 630 (step 704) along with an encryption code based on the identified access level (step 705).

In a next operation, access platform 640 receives a request to view one or more data portions of a block entry wherein the request comprises an encryption code associated with at least one access level (step 706). The encryption code may be associated with a public, permissive, or private access level. Access platform 640 then evaluates the encryption code in the request with each of the one or more portions of data in blockchain 630 (step 707). If the encryption code associated with the requesting user is determined to be public, a customized view (e.g., record 602) will be generated for the requesting user indicating only Bet Amount from block entry 601 (step 708). If the encryption code associated with the requesting user is determined to be permissive, a customized view will be generated for the requesting user indicating Bet Amount and Age from block entry 601 (step 709). If the encryption code associated with the requesting user is determined to be private, a customized view will be generated for the requesting user indicating all portions of the data from block entry 601 (i.e., Bet Amount, Credit Card Number, and Age) (step 710).

Figure 8:
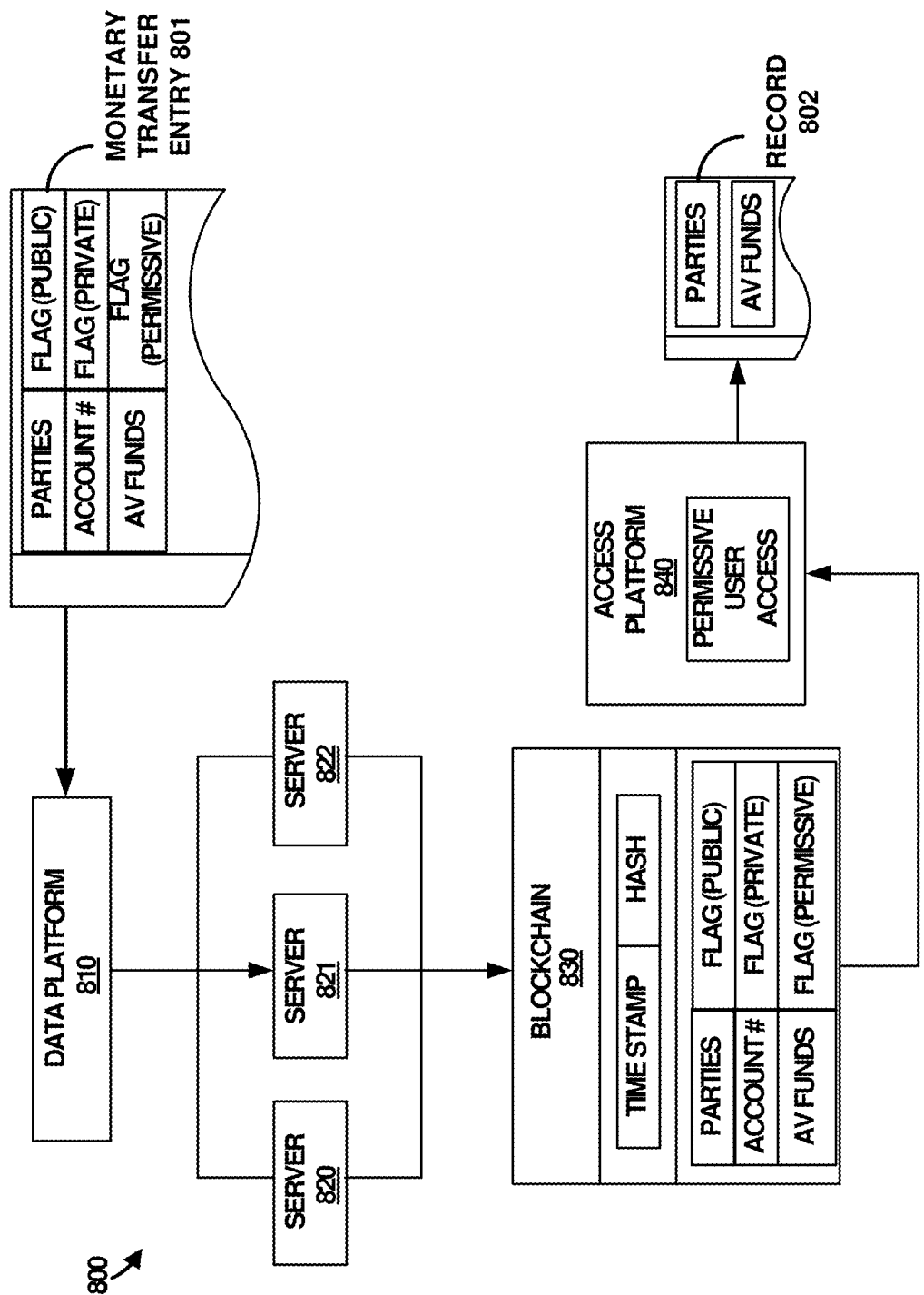
FIG. 8 illustrates a block diagram in an implementation of an enhanced application to generate a customized view of restricted transactions recorded into a blockchain.

FIG. 8 illustrates a block diagram in an alternative implementation of an enhanced application to generate a customized view of restricted transactions recorded into a blockchain. Block diagram 800 includes monetary transfer block entry 801, data platform 810, servers 820-822, blockchain 830, access platform 840, and record 802.

Block entry 801 is representative of any data transaction that will be permanently recorded into the blockchain. Block entry 801 is subsequently processed by miners and added to a block at the end of the blockchain by data platform 810. Block entry 801 further comprises portions of data which have been represented herein by Parties to the Transaction, Bank Account Number, and Available Funds. It should be noted that while each of the data portions is represented separately, the portions of data are part of one transaction represented by block entry 801. Block entry 801 may comprise any transaction or contract which has been executed and recorded in a distributed ledger platform environment. However, in this example, block entry 801 comprises a banking transaction transferring money from one user's bank account to another user's bank account.

Data platform 810 represents any computing system or systems capable of hosting a blockchain application, of which controller 1800 in FIG. 18 is representative. Data platform 810 provides a secure distributed ledger system for recording transactions into the blockchains. Data platform 810 may be implemented across a multitude of distributed network nodes which may be accessed by a variety of users, such as tax auditors, financial institutions, gaming regulation committees, customers, company employees, and the like.

Data platform 810 also includes servers 820-822. Servers 820-822 may be representative of any computing system or systems with which the distributed network nodes may communicate. Examples include other devices having corresponding applications or services installed thereon, such that an operating user of a user device may be able to transfer a transaction to be added to a blockchain and distributed amongst the network nodes of the distributed network. Examples include media servers, web servers, and other types of end-points that may transmit transaction data to or receive transaction data from user devices and network nodes.

Block diagram 800 further includes blockchain 830. Blockchain 830 contains a continuously growing list of records, called blocks, which are linked and secured using cryptography. Each of the block in blockchain 830 contains a timestamp and a hash. The hash includes both a cryptographic hash of the current block and a cryptographic hash of the previous block in the blockchain. Each block also contains data associated with a block entry. In this example scenario, each portion of data (Parties, Account Number, and Available Funds) have been recorded into blockchain 830 with a separate access level flag.

Additionally, each of the access level flags associated with each of the data portions in blockchain 830 is associated with a separate access level. For example, Parties is associated with a public access flag which allows any user interacting with the distributed ledger to view that portion of data in the block. A public user may be any user interested in viewing the Parties to the Transaction and no privacy exists for this portion of data. Conversely, Account Number is associated with a private access flag which may only be accessed and viewed by authorized users, such as the transferring bank for each party. Available Funds is associated with a permissive access flag which may be view by a limited set of parties but not all users. For example, Available Funds may be required to be view by receiving bank to ensure that funds are available in the transferring account to complete the monetary transaction.

Access platform 840 represents any computing system or systems, or other suitable means capable of validating user request(s) to access blockchain entry data, of which controller 1800 in FIG. 18 is a representative means. Where such means for validating user request(s) to access blockchain entry data is embodied in access platform 840, a secure access flag mediator may be provided between the portions of data recorded in blockchain 830 and the generation of record 802 for a requesting user. Access platform 840 may be implemented across a multitude of distributed network nodes which may be accessed by a variety of users, such as tax auditors, financial institutions, gaming regulation committees, customers, company employees, and the like. Record 802 is illustrative of what a user may view when requesting to view the transaction data stored in from block entry 801. Record 802 may contain all or none of the data portions originally entered in block entry 801 and is generated based on the authorization provided by the requesting user and access level each portion of data is associated with.

Figure 9:
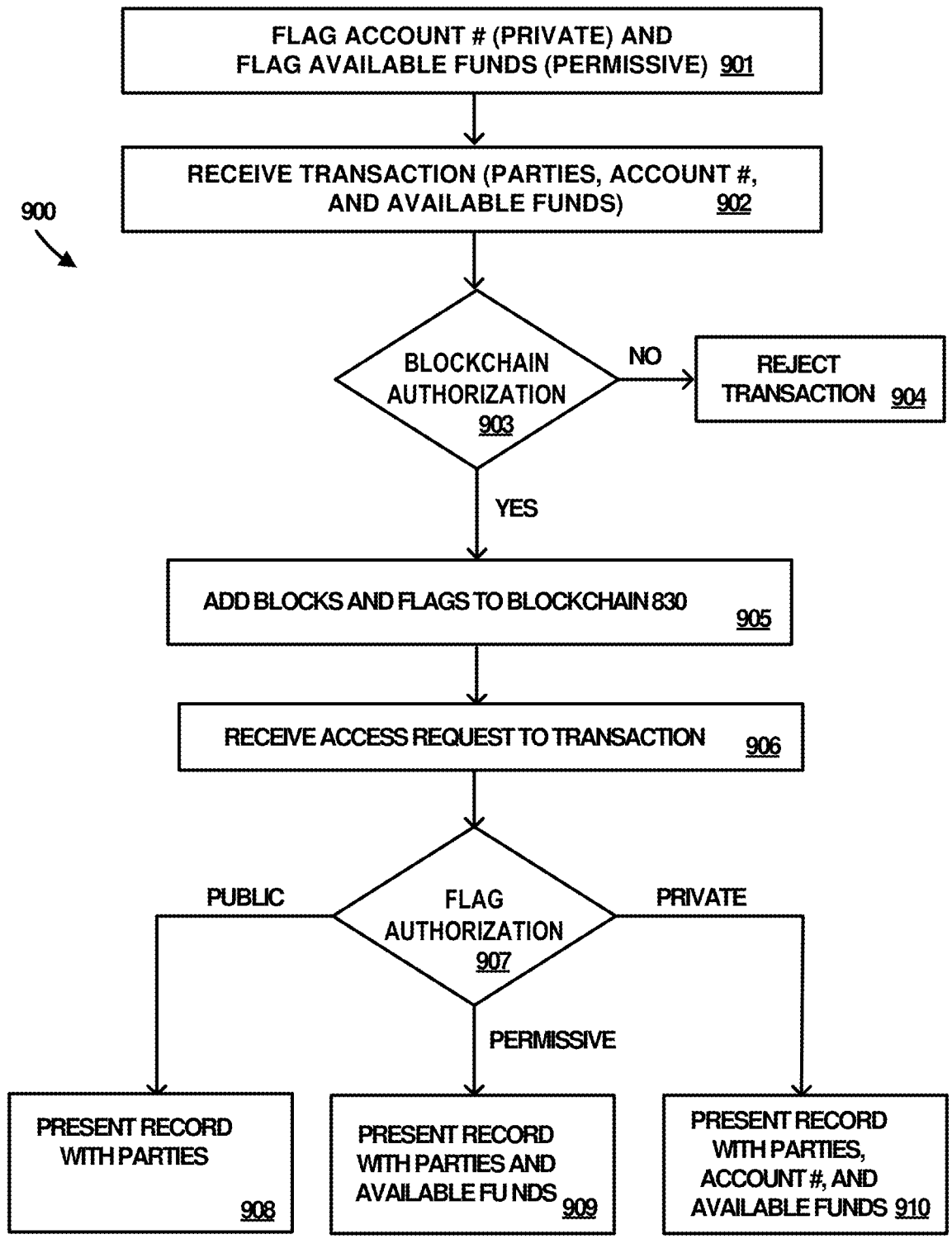
FIG. 9 illustrates a flow diagram in an implementation of an enhanced application to generate a customized view of restricted transactions recorded into a blockchain.

FIG. 9 illustrates a flow diagram in an implementation to generate a customized view of restricted transactions recorded into a blockchain. Some or all of the steps of view customization process 900 may be implemented in program instructions in the context of a component or components of the application used to carry out the customized view feature.

In operation, data platform 810 receives block entry 801 which is to be maintained in blocks of blockchain 830 (step 901). Block entry 801 is requested by a user from a user device in the distributed network of nodes and contains the data portions. Data platform 810 then authorizes the entry (e.g., miners validate the hash in the block) (step 902). If the block is not validated, the transaction (block entry 801) is rejected (step 903). However, if the block is accepted, each of the portions of data are evaluated for an access level and added to blockchain 830 (step 904) along with an access flag based on the identified access level (step 905).

In a next operation, access platform 840 receives a request to view one or more data portions of a block entry wherein the request comprises an access code associated with at least one access level (step 906). The access code may be associated with a public, permissive, or private access level. Access platform 840 then evaluates the access code in the request with each of the portion of data in blockchain 830 (step 907). If the access code associated with the requesting user is determined to be public, a customized view (e.g., record 802) will be generated for the requesting user indicating only Parties from block entry 801 (step 908). If the access code associated with the requesting user is determined to be permissive, a customized view will be generated for the requesting user indicating Parties and Available Funds from block entry 801 (step 909). If the access code associated with the requesting user is determined to be private, a customized view will be generated for the requesting user indicating all portions of the data from block entry 801 (e.g., Parties, Account Number, and Available Funds) (step 910).

Figure 10:
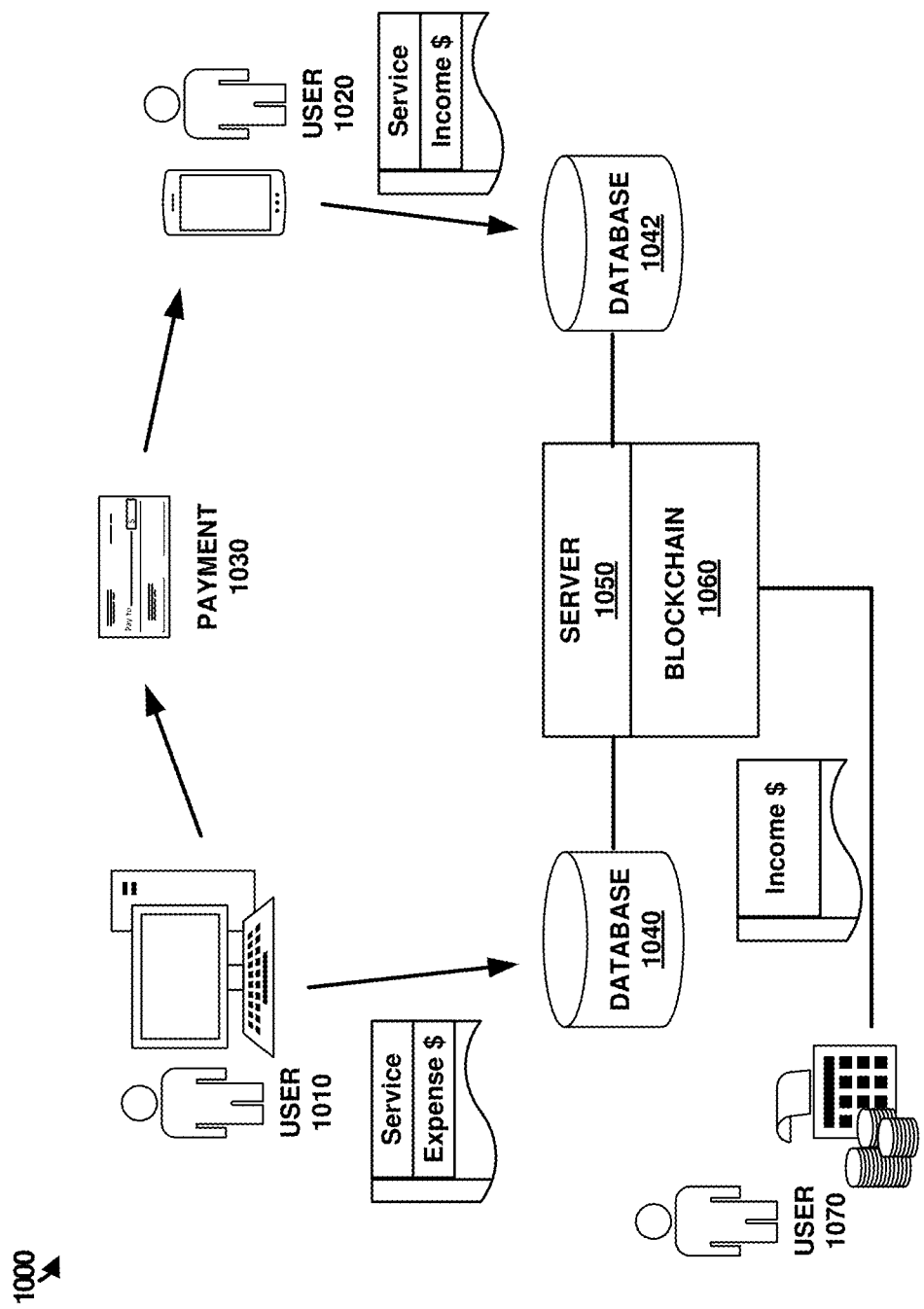
FIG. 10 illustrates an exemplary operational architecture in an implementation of a financial auditing scenario to generate a customized view of restricted transactions recorded into a blockchain.

FIG. 10 illustrates an exemplary operational architecture in an implementation of a financial auditing scenario to generate a customized view of restricted transactions recorded into a blockchain. In operation, user 1010 transfers paycheck 1030 to user 1020 in exchange for services. A record of the transaction is transferred from user 1010 to database 1040 indicating the name of the service and the expense cost. The record is then maintained in blockchain 1060 via server 1050. It should be noted that in this scenario, the transaction is also recorded on the receiving end by user 1020 where a record of the transaction indicating a profit and the service is transferred to database 1042 and maintained in blockchain 1060 via server 1050.

In a next operation, government tax auditor 1070 requests to view the profit recorded for user 1020. User 1070 may not be authorized to view the service recorded in the record or the expense from user 1010. Server 1050 may receive the request and process an access code indicating that at this point in time, user 1070 is only authorized to view the profit for user 1020. A customized view of the record is then generated for user 1070 by server 1050 indicating only the profit for user 1020. Although user 1070 is unable to see the full record of the transaction, user 1070 is able to trust that the portion of the record indicating the profit of user 1020 is valid since it has been maintained in blockchain 1060.

Figure 11:
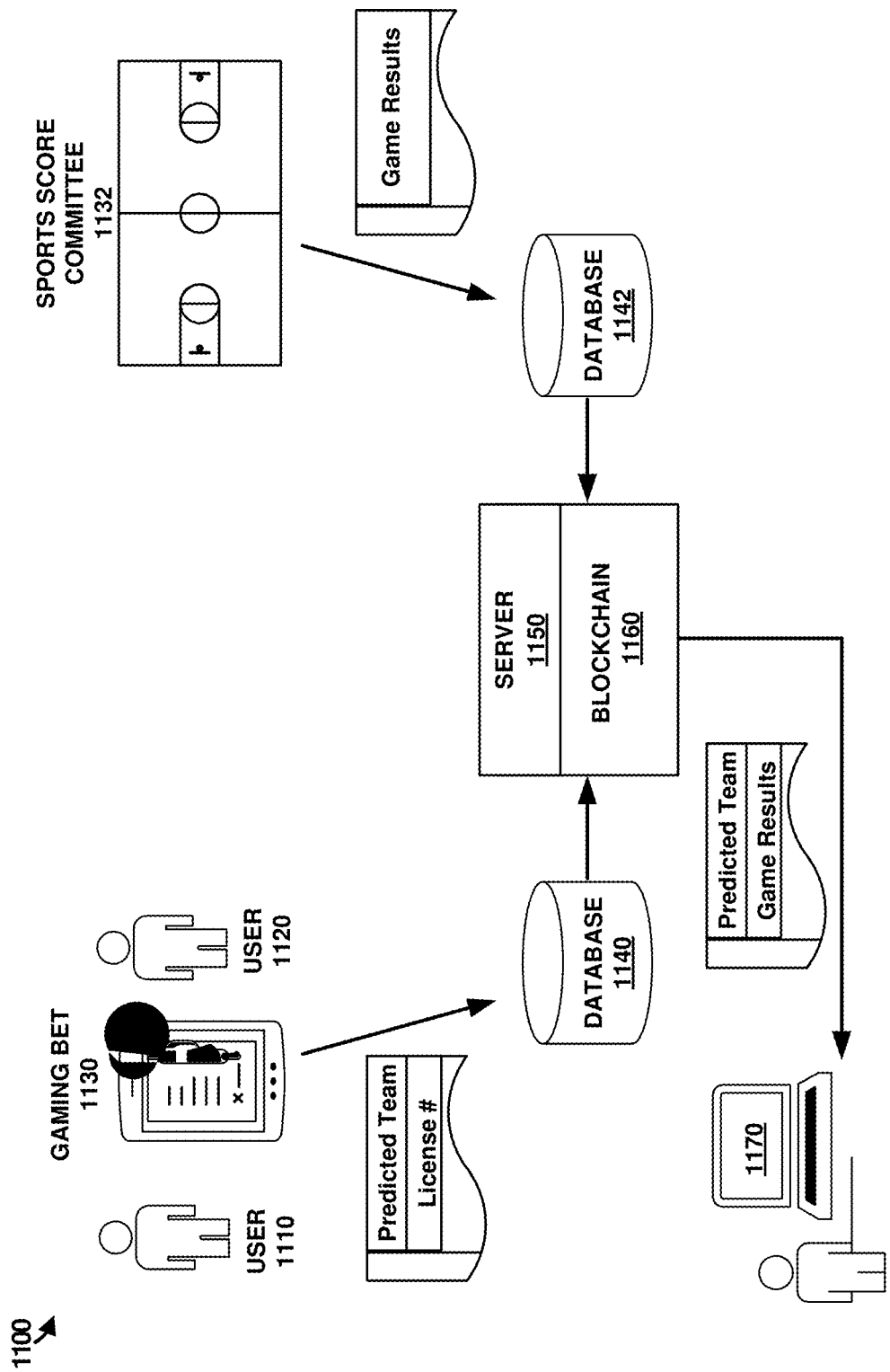
FIG. 11 illustrates an alternative operational architecture in an implementation of a gaming regulation scenario to generate a customized view of restricted transactions recorded into a blockchain.

FIG. 11 illustrates an alternative operational architecture in an implementation of a gaming regulation scenario to generate a customized view of restricted transactions recorded into a blockchain. In operation, user 1110 signs sports bet 1130 with user 1111. A record of sports bet 1130 is transferred from the users to database 1140 indicating the predicted teams and the driver's license number of users 1110-1111. The record is then maintained in blockchain 1160 via server 1150. It should be noted that in this scenario, the transaction also initiates a transfer from sports scoring committee 1132 to database 1142 indicating the official score of the game. The official score of the game is transferred to database 1142 and maintained in blockchain 1160 via server 1150.

In a next operation, sporting bet management user 1170 may request to see the predicted results along with the official score of the game from blockchain 1160. User 1170 may not be authorized to view the driver's licenses of each of users 1110-111. Server 1150 may receive the request and process an access code indicating that at this point in time, user 1170 is only authorized to view the predicted results of each of users 1110-1111 and the official score. A customized view of the record is then generated by server 1150 indicating only the predicted results and the official score for user 1170. Although user 1170 is unable to see the full record of the transaction, user 1170 is able to trust that the portion of the record indicating that users 1110-1111 have a valid driver's license on file since this data has been maintained in blockchain 1160.

Figure 12:
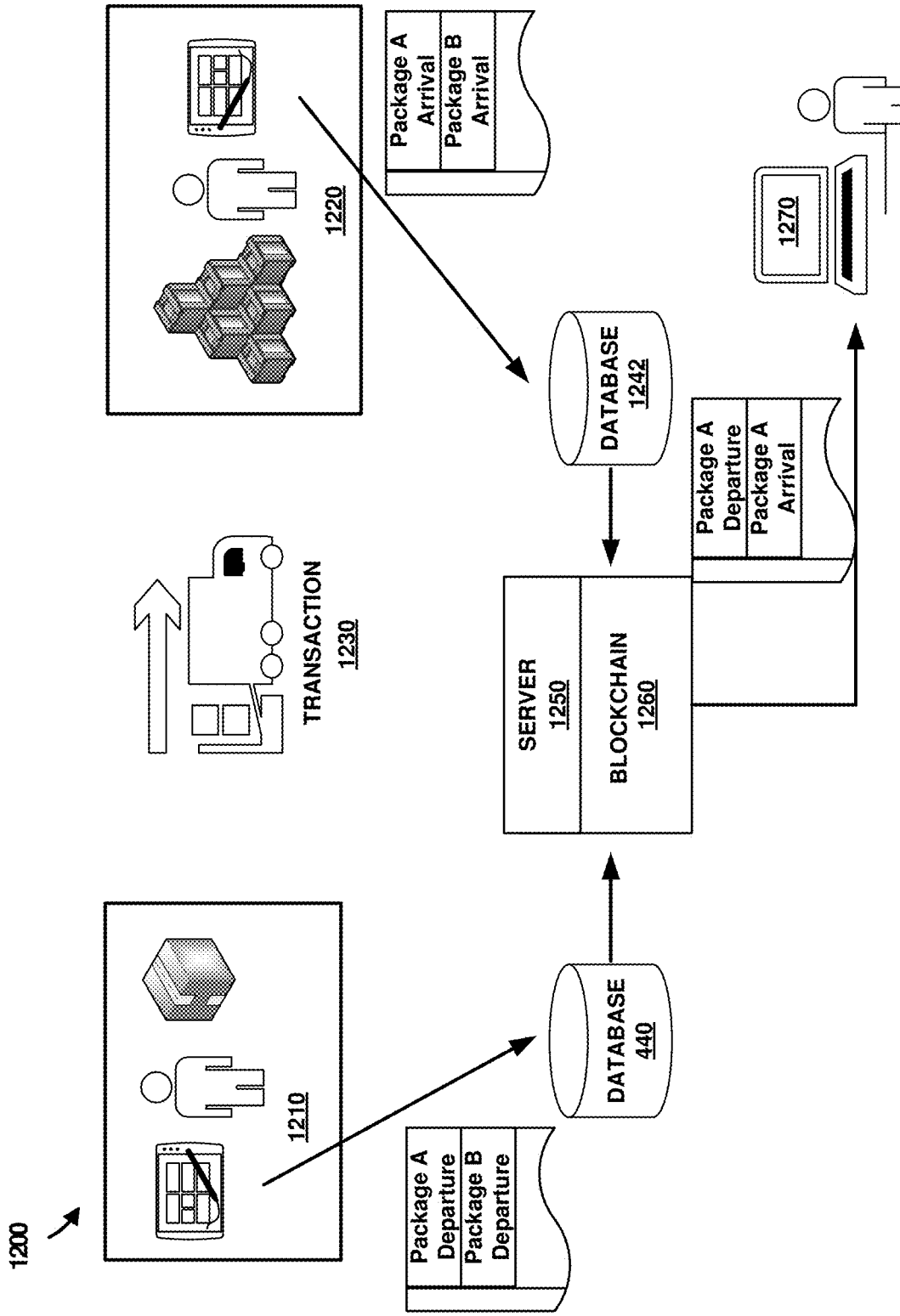
FIG. 12 illustrates an alternative operational architecture in an implementation of an inventory tracking scenario to generate a customized view of restricted transactions recorded into a blockchain.

FIG. 12 illustrates an alternative operational architecture in an implementation of an inventory tracking scenario to generate a customized view of restricted transactions recorded into a blockchain. In operation, user 1210 transfers cargo of packages 1230 to user 1220 to be delivered to various users, including user 1270 tracking Package A. A record of the departure time transaction for cargo of packages 1230 is transferred from user 1210 to database 1240 indicating the departure time of Package A and Package B. The record is then maintained in blockchain 1260 via server 1250. It should be noted that in this scenario, the arrival time transaction for cargo of packages 1230 is also recorded on the receiving end by user 1220 where a record of the transaction indicating the arrival time of Package A and Package B is transferred to database 1242 and maintained in blockchain 1260 via server 1250.

In a next operation, user tracking Package A 1270 requests to view the departure time and arrival time recorded for Package A. User 1270 may not be authorized to view the departure time and arrival time recorded for Package B. Server 1250 may receive the request and process an access code indicating that at this point in time, user 1270 is only authorized to view the departure time and arrival time recorded for Package A. A customized view of the record is then generated for user 1270 by server 1250 indicating only departure time and arrival time recorded for Package A.

Figure 13:
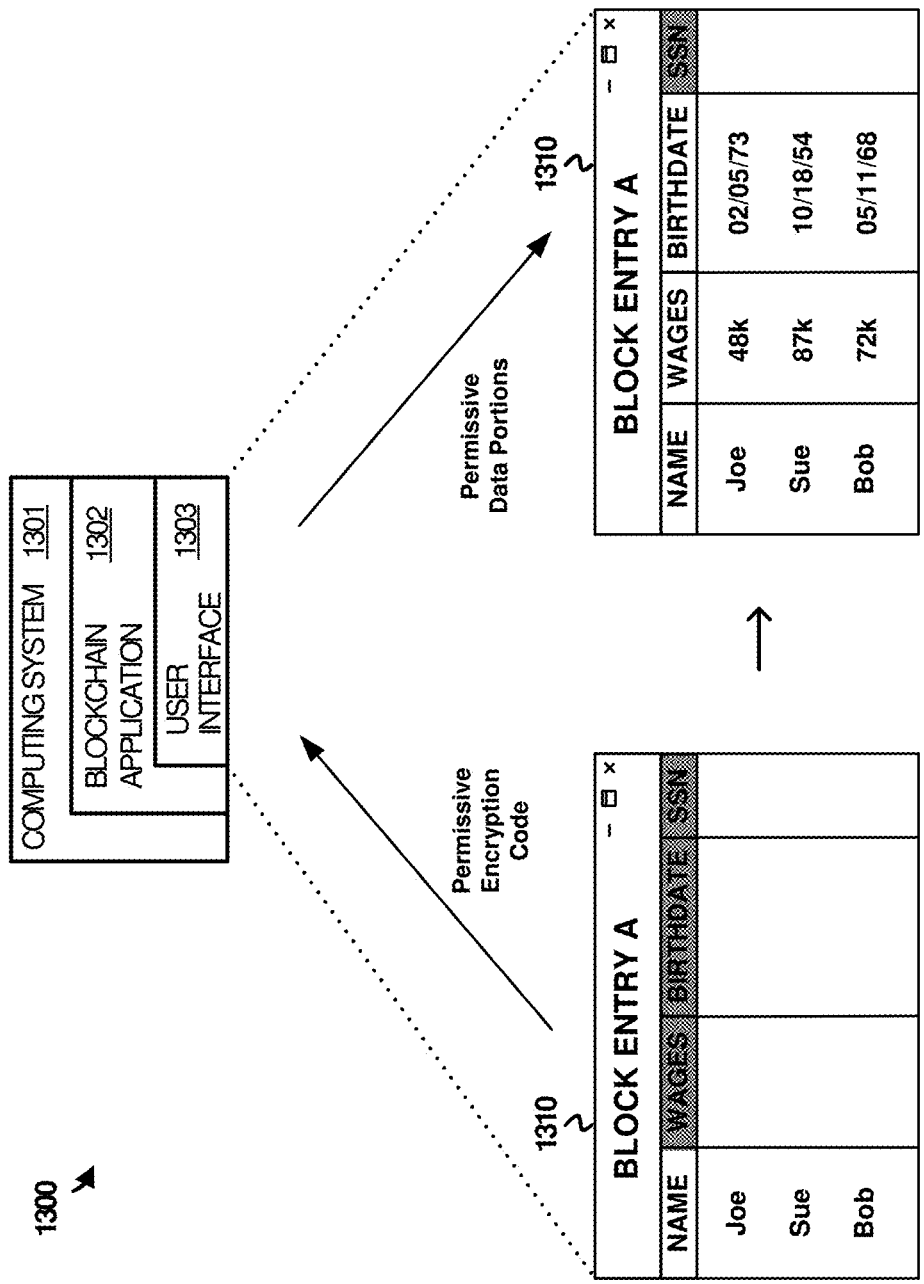
FIG. 13 illustrates an exemplary customized view of restricted transaction recorded into a blockchain.

FIG. 13 illustrates an exemplary customized view of restricted transactions recorded into a blockchain. FIG. 13 includes computing system 1301, which comprises one or more devices capable of running a blockchain application natively or in the context of a web browser, streaming an application, or executing an application in any other manner. Computing system 1301 may include various hardware and software elements in a supporting architecture suitable for generating a customized view of a payroll transaction record. One such representative architecture is illustrated in FIG. 18 with respect to controller 1800.

Computing system 1301 also includes blockchain application component 1302 capable of maintaining a complete record of the blockchain transactions in accordance with the processes described herein. User interface 1303 includes customized view 1310 which may be produced by blockchain application component. User interface 110 may display portions of data from a block entry which a user is authorized to view. The user may initially only have access to view public portions of the block entry, such as the name of each employee who is on the payroll.

An encryption code may then be transferred in a request to view permissive portions of data. Once computing system 1301 verifies the encryption code, permissive portions of data may be added to customized view 1310. The permissive portions of data include the wages and birthdates of each employees on the payroll transaction. However, the social security numbers of each of the employees may remain private and therefore, the user will be unable to view the social security data in customized view 1310.

Figure 14:
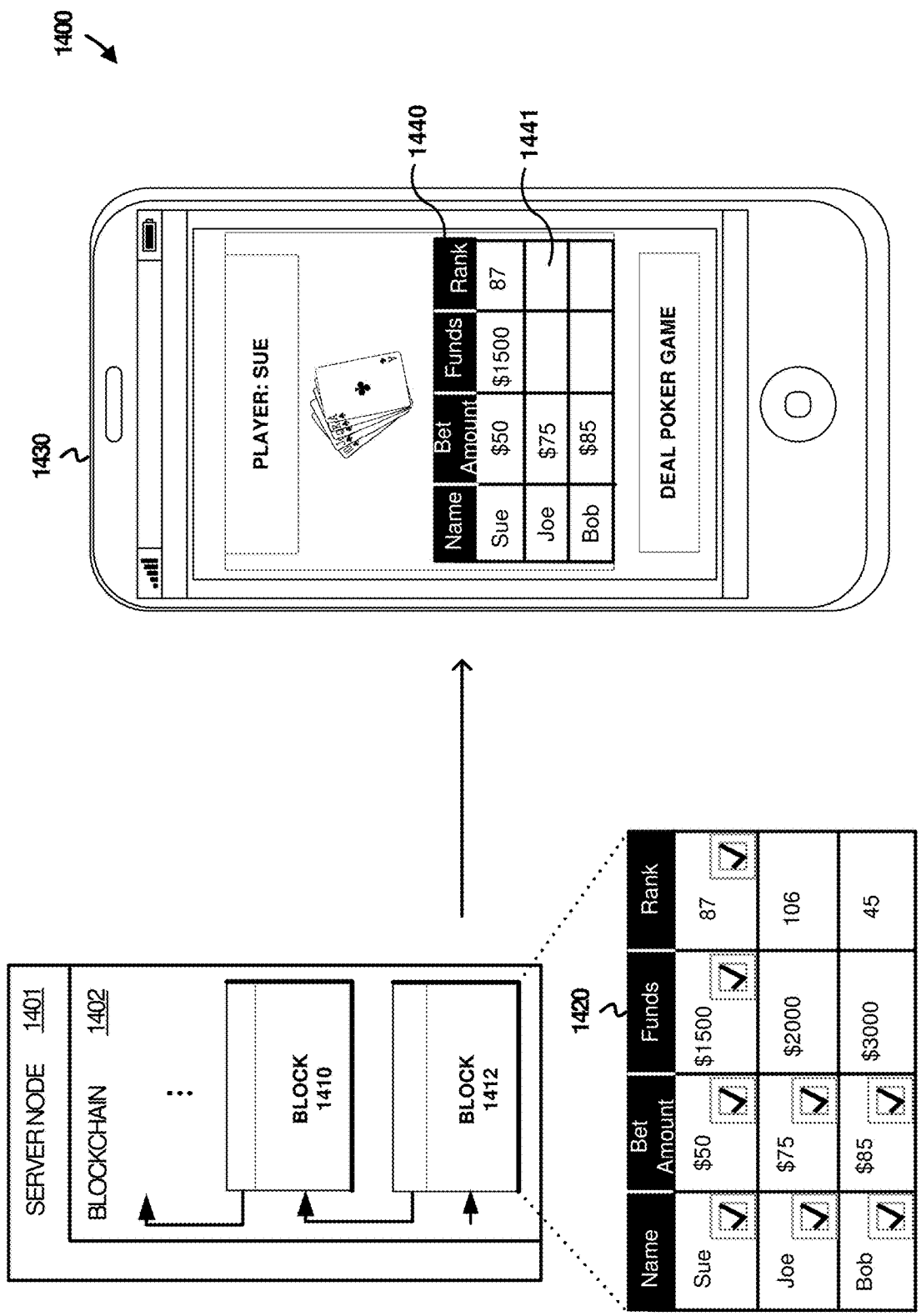
FIG. 14 illustrates an alternative exemplary customized view of restricted transaction recorded into a blockchain.

FIG. 14 illustrates an alternative exemplary customized view of restricted transaction recorded into a blockchain. FIG. 14 includes server node 1401 storing a copy of blockchain 1402. Blockchain 1402 stores blocks which have been chained using hash codes, such as blocks 1410 and 1412. Each block contains transactions which may be further broken down into portions of data. For example, block 1412 stores online poker game bet entry 1420. Bet entry 1420 includes names of each of the players, a bet amount for each of the players, an amount of funds each player has available to make the bet, and a player rank index. It should be noted that additional data may also be included in block 1412, such as game statistics, win/loss percentages, etc.

For each user requiring access to the bet entry, a check mark is included to indicate which portions of data may be viewed by each of the users. For example, Sue is accessing the poker game bet entry using mobile device 1430. In this example scenario, Sue is authorized to view each of the names of the players and the bet amounts since the names and bet amounts are accessible to the public. Sue is also allowed private access to her own funds amount and rank. However, Sue does not have access to the available funds and rank of the other players. As can be seen in the customized view displayed on mobile device 1430, Sue views authorized data portions 1440 and is blocked from viewing unauthorized data portions 1441.

Figure 15:
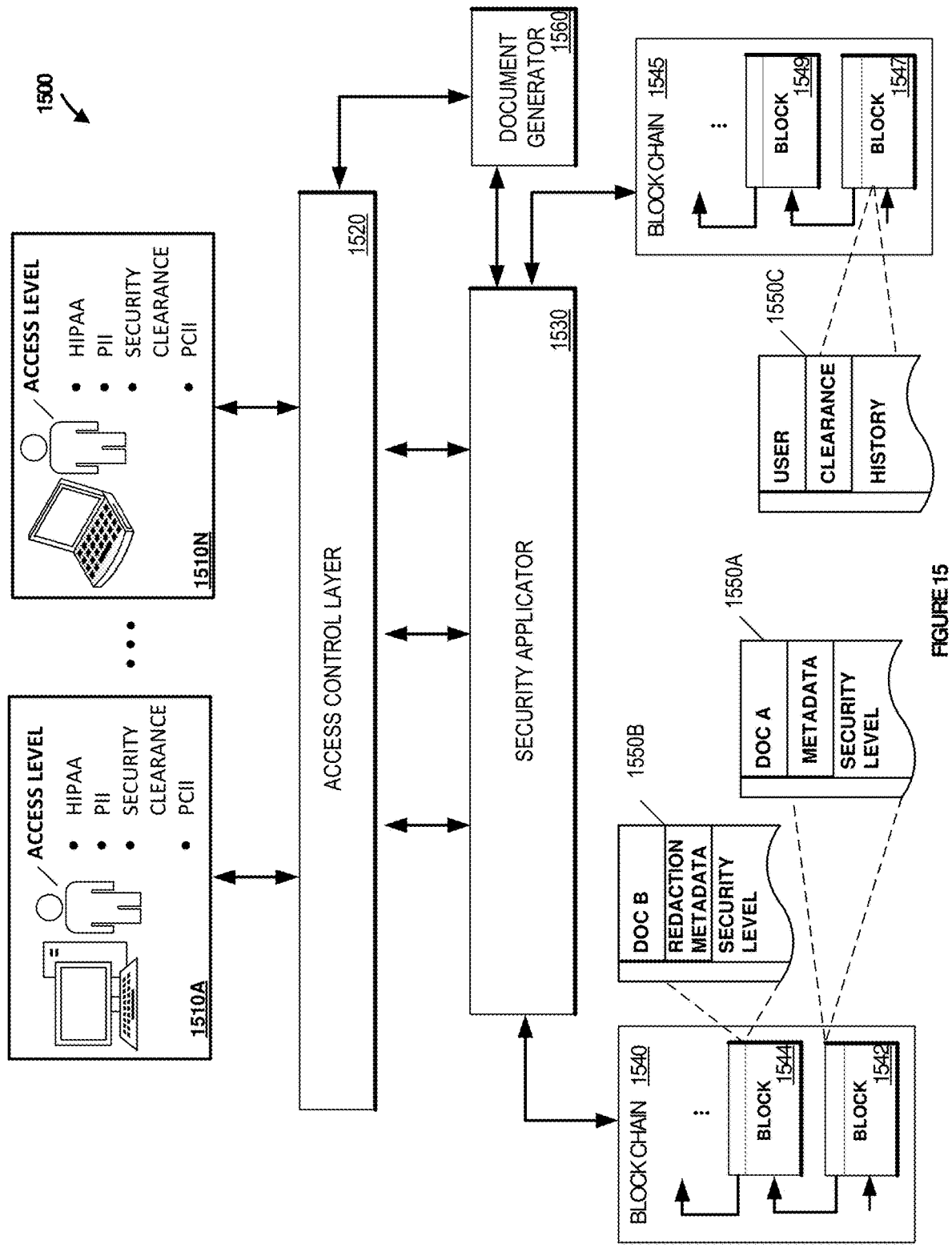
FIG. 15 illustrates an alternative operational architecture in an implementation of a data access system capable of providing a customized view of restricted or sensitive data recorded into a blockchain.

FIG. 15 illustrates an alternative operational architecture in an implementation of a data access system capable of providing a customized view of restricted or sensitive data recorded into a blockchain. In an example, such restricted or sensitive data includes data that requires restricted access privileges to view or otherwise access it (e.g., "access-restricted data"). As illustrated in FIG. 15, users 1510A-1510N can use various electronic devices to request access to a document, electronic record, physical location (e.g., safe, secure room, building, area, State, Country, hotel, casino, home, gas station, hospital, church, military base etc.), or information. For example, in accordance with various embodiments users 1510A-1510N may have different access levels such as a security clearance that grants the user access to classified information (e.g., state or organizational secrets) or to restricted areas. Typically, a security clearance (e.g., classified, secret, top secret, etc.) is not sufficient to gain access to all documents and/or data. Instead, the individual must also have a need to know the specific information.

The request can be submitted to access control framework 1520 which can translate and validate the requests from different systems (e.g., application, key card system, fingerprint readers, biometric devices, passwords, multi-factor authentication, and the like). Upon validation, the access control framework can submit the request to security applicator 1530 which can process the request using various security protocols. For example, the security level of the requests document or location may require additional multiple validations (e.g., password and hardware device, biometrics, location verification, PINs, passwords, etc.). Security application, in some embodiments, may pull this information from a field and/or metadata within a block on a blockchain associated with the data.

The document or data 1550A-1550B stored in blockchain 1540 may have different fields or portions that can be accessed by different individuals with differing "needs to know" or access levels (e.g., a compliance officer vs. a lower level employee of a company, individual with higher security clearance level vs. one with a lower security clearance level, etc.). For example, in some embodiments, various redaction mappings may be stored in the blockchain and applied by document generator 1560 before being presented to users 1510A-1510N. As such, two users requesting the same document or data may be presented with different results.

As an example, a freedom of information act (FOIA) access request may yield redacted documents which have been deemed as available to the public while an individual with security clearance and a need to know will be presented with a different, more expansive, level of access. In accordance with various embodiments an initial request may be received from a user. The system can identify the information that is compliant with the request and set a timer period for responding to the request (e.g., 30 days) to the FOIA request. The system can then determine whether each piece of information compliant with the request has any classification restrictions. If any of the information is determined to be unrestricted (e.g., no classification levels), then the system can respond to the user who made the request with a response that includes information without inspection. This type of feature reduces the workload of governmental employees and ensures that the response time period is met (e.g., by prioritizing and reassigning review among employees). In some embodiments, if enough time remains, the system may request a human review and approve the included information before sending.

When the system identifies confidential information, the system would next evaluate the access and clearance. If for example, the person requesting the data had a higher access/clearance than an administrator, then the information would be automatically sent. If redactions need to be made to comply with the security clearance, then document generator 1560 may apply any redactions needed and/or remove documents that should not be included in the response. While not illustrated in FIG. 15, some embodiments may include a machine learning/artificial intelligence component to review the data and/or metadata and identify portions that should not be included.

Other embodiments may have other types of individuals seeking varying information (e.g., people seeking information on a gambler, a banking client, regulators performing audits, etc.). Many such use cases exist. Also, some embodiments may use decentralized applications (Dapps) that have backend code running on a decentralized peer-to-peer network to submit the request, retrieve information from the blockchains, and communicate with other applications (e.g., other Dapps).

Security applicator 1530 may also review the status of the credentials or security level of the user. The record of the user may be stored on blockchain 1545. For example, information regarding background checks, bank account information, travel information, projects the user is associated with (past and present), family history, medical history, credentials, biometrics, passwords, signatures, and the like can be stored in the user's record. Security applicator 1530 may retrieve that information and utilize the information in generating the customized view of the data or document.

Figure 16:
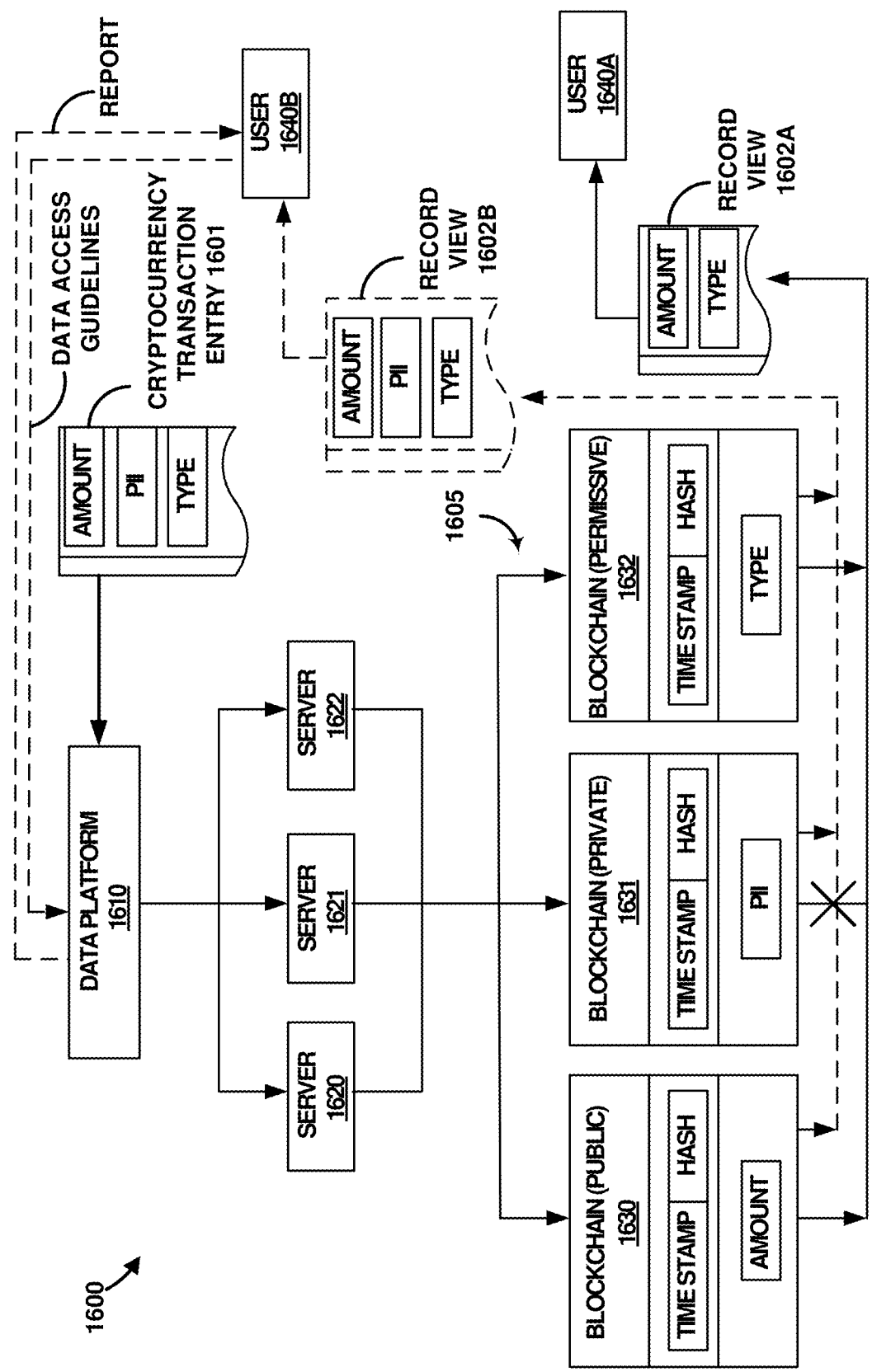
FIG. 16 illustrates a block diagram in an implementation of an enhanced application to generate a customized view of restricted transactions recorded into a blockchain.

FIG. 16 illustrates block diagram 1600 in an implementation of an enhanced application to generate a customized view of restricted transactions recorded into a blockchain. Block diagram 1600 includes cryptocurrency transaction block entry 1601, data platform 1610, servers 1620-1622, blockchains 1630-1632, and record 1602.

Block entry 1601 is representative of any data transaction that will be permanently recorded into the blockchain. Block entry 1601 is subsequently processed by miners and added to a block at the end of the blockchain by data platform 1610. Block entry 1601 further comprises portions of data which have been represented herein by Amount, PII, and Type. It should be noted that while each of the data portions is represented separately, the portions of data are part of one transaction represented by block entry 1601. Block entry 1601 may comprise any transaction or contract which has been executed and recorded in a distributed ledger platform environment. In this example, block entry 1601 may comprise a hard, or digital, transfer of a fiat currency into the form of a cryptocurrency.

Referring still to FIG. 16, in a use case, an individual may desire to transfer an amount of money (e.g., 100,000 Turkish Lira) into the form of a cryptocurrency (e.g., Bitcoin). In another use case, still referring to FIG. 16, an individual may desire to exchange hard currency (e.g., 100,000 Turkish Lira) into a stable coin cryptocurrency (e.g., Diem). A variety of mechanisms may be available for the individual to accomplish either of those transactions including, without limitation, an Internet exchange, a web-based broker, or an in-person agent. In any event, those mechanisms may communicate with or otherwise utilize, at least in part, data platform 1610 according to the present technology to accomplish, mediate, or otherwise facilitate generation of cryptocurrency transaction entry 1601 and/or storage of same on the blockchain.

As part of the aforementioned example cryptocurrency transaction, the individual may be required to provide not only the amount of fiat currency involved (e.g., 100,000 Turkish Lira), but also their name and perhaps also one or more additional pieces of PII, along with the type of cryptocurrency (e.g., Bitcoin vs. Diem). These data may then be respectively stored in the blockchain entry 1601 as Amount, PII, and Type, respectively, as shown, for example, in FIG. 16. In some embodiments, entry 1601 may further include an identifier of a cryptocurrency wallet, which may or may not be classified as PII depending on, for example, the type of cryptocurrency and/or the applicable laws and regulations of a jurisdiction where one or both parties to the transaction reside.

Data platform 1610 represents any computing system or systems capable of hosting a blockchain application, of which controller 1800 in FIG. 18 is representative. Data platform 1610 provides a secure distributed ledger system for recording transactions into the blockchains. Data platform 1610 may be implemented across a multitude of distributed network nodes which may be accessed by a variety of users 1640. A first category 1640A of users may include interested persons such as economic analysts, academic researchers, or any member of the public. Users 1640A may be interested in viewing data stored on the blockchain for purposes of answering questions such as the aggregate amount of Turkish Lira exchanged for a stable coin cryptocurrency over the last year, for example. Users 1640A may or may not be interested in the PII associated with individual transactions but, in any event, users 1640A are not permitted to view any such PII. As such, users 1640A utilizing, at least in part, the systems and methods according to the present technology may only view Amount and Type in their respectively provided customized record view 1602A.

A second category 1640B of users may include regulatory agencies or other entities having a specific reason to be able to view PII associated with individual transactions. Such users 1640B may include tax auditors, financial institutions, gaming or gambling authorities, regulators, police, and the like. Users 1640B may be interested in viewing data stored on the blockchain for purposes of answering questions such as the name, address, and national ID number of the individual who transferred 100,000 Turkish Lira for Bitcoin on a certain date. With proper authority credentials, users 1640B utilizing, at least in part, the systems and methods according to the present technology may be able to view Amount, PII and Type in their respectively provided customized record view 1602B.

Data platform 1610 can also include servers 1620-1622. Servers 1620-1622 may be representative of any computing system or systems with which the distributed network nodes may communicate. Examples include other devices having corresponding applications or services installed thereon, such that an operating user (1640A and/or 1640B) of a user device may be able to transfer a transaction to be added to a blockchain and distributed amongst the network nodes of the distributed network. Examples include media servers, web servers, and other types of end-points that may transmit transaction data to or receive transaction data from user devices and network nodes. In some embodiments, data platform 1610 can dynamically select which servers 1620-1622 are authorized to store the data. For example, companies or governments may have geographical restrictions, encryption standards, network security standards, or other restrictions on the server nodes on which the blockchain is stored. Data platform 1610 can therefore manage the logistics of dynamically selected servers based on these restrictions. For example, if a particular server is deemed to be under attack or hacked, then data platform 1610 can dynamically remove that server from the blockchain network and consider adding one or more additional servers if needed. As such, each owner of the data can set selection criteria for where the data should be stored and the minimum data security and/or other IT standards needed for that server group.

Block diagram 1600 further includes blockchains 1630-1632. Blockchains 1630-1632 can contain a continuously growing list of records, called blocks, which are linked and secured using cryptography. Each of the block in blockchains 1630-1632 contains a timestamp and a hash. The hash includes both a cryptographic hash of the current block and a cryptographic hash of the previous block in the blockchain. Each block also contains data associated with a block entry. In this example scenario, each portion of data (Amount, PII, and Type) have been separately recorded into a different block and in a separate blockchain 1630-1632.

Additionally, each of blockchains 1630-1632 is associated with a separate access level. For example, blockchain 1630 is a public access blockchain which allows any user (e.g., user 1640A) interacting with the distributed ledger to view the blocks and data portions stored within each block of blockchain 1630. A public user may be any user interested in viewing the transaction in blockchain 1630 and no privacy exists for this portion of data. Conversely, blockchain 1631 is a private blockchain whose data portions may only be accessed and viewed by authorized users, such as tax authorities or duly authorized personnel of other regulatory agencies. In this example scenario, PII has been separately stored on blockchain 1631 and is private from all users 1640A interacting in the blockchain network except those with exclusive access to the data, such as users 1640B, who may require additional credentials to gain access (e.g., to view) PII associated with the cryptocurrency transaction, as in a court order. Blockchain 1632 is a permissive blockchain meaning that a limited set of parties may view the data portions recorded in the block but not necessarily all users. In the use cases associated with FIG. 16, users 1640A are authorized to view data stored in blockchain 1632, and for this purpose only, users 1640A also include users 1640B. Type has been stored within blockchain 1632 and may be viewed by parties who are allowed access to the data, to include any of users 1640A and 1640B. In an alternative embodiment, the cryptocurrency wallet identifier for the transaction may be stored in blockchain 1632 and a third category of users not including all of users 1640A may be authorized to view that data.

With continued reference to the above described use cases associated with FIG. 16, record view 1602A is illustrative of what user 1640A may view when requesting to view the transaction data stored in from block entry 1601. Record 1602A may contain all or none of the data portions originally entered in block entry 1601 and is generated based on the authorization provided by the requesting user 1640A and access level each portion of data is associated with. Likewise, record view 1602B is illustrative of what user 1640B may view when requesting to view the transaction data stored in from block entry 1601. Record 1602B may contain all or none of the data portions originally entered in block entry 1601 and is generated based on the authorization provided by the requesting user 1640B and access level each portion of data is associated with. In the use cases, user 1640B may view PII along with Amount and Type, while user 1640A may only view Amount and Type.

In an embodiment, data platform 1610 includes a communications component and the above-described access control framework 1520 (also referred to herein as access control layer) according to the present technology. The communications component of data platform 1610 receives requests from users (1640A and/or 1640B) to access one or more entries 1601 stored in one or more of the public, private and permissive separate blockchains, or constituent parts of, the blockchain 1605. Data platform 1610 may also receive data access guidelines governing access by users 1640A and/or 1640B to data segments or portions of the one or more entries 1601 stored in the distributed ledger.

Data platform 1610 may receive the data access guidelines from one or more of a variety of sources. Data access guidelines may provide a framework for how particular data of entries (e.g., 1601) are to be routed for processing and storage in the distributed ledger. In one embodiment, the entry 1601 is generated with preset data fields such that when received by data platform 1610, the PII data always resides in a predetermined field location and can be automated routed by data platform 1610 to private blockchain 1631. Similarly, Amount and Type always reside in predetermined data field locations and may be automatically routed to their respective destinations in public 1630 and permissive 1632 blockchains, respectively. Accordingly, the data access guidelines may specify the locations for specific data categories to arrive at data platform 1610 with entry 1601. In an example, data platform 1610 access control layer rejects receipt for any entry 1601 not conforming to data field locations specified by the data control guidelines.

In another embodiment, the data access guidelines are received by data platform 1610 from an originator of the data constituting entry 1601. For example, a stable coin exchange agent regulated by a government tax authority is required by law to collect PII in addition to amount and type data. Despite their collecting the PII, the exchange agent in this example may in fact be in the first category of users 1640A and thus not actually be able to view the PII of the individual with whom they are transacting. Nevertheless, the stable coin exchange agent will transmit the data access guidelines along with the data constituting the entry 1601 to data platform 1610. In this example, the data access guidelines will specify that PII is to be routed to the private blockchain 1631 and that any requests to view the PII stored there must conform to heighted access authorization, as in such requests include a specific access code according to the present technology.

In some embodiments, the data access guidelines are received by data platform 1610 from a regulator or other entity responsible for creating and/or enforcing laws and other legal rules pertaining to the business or other activities for which the systems and methods of the present technology are being beneficially applied. For instance, as shown in FIG. 16, user 1640A may be a government tax auditor, where laws of the respective government provide for not only that the individual transacting in the cryptocurrency is responsible for paying tax on profits made from the transaction, but also that his or her PII must be protected from view by the exchange agent and the public generally. In this example, the cryptocurrency exchange agent may not be responsible for transmitting the data access guidelines to the data platform 1610. Instead, the government user 1640B transmits them directly to data platform 1610 for use by, for instance, access control layer upon receipt of data constituting entry 1601.

In an example, access control layer automatically encrypts or otherwise obfuscates PII that is received from a transaction originator, for example. Where the data is received by data platform 1610 already sorted into predetermined data field locations, access control layer of data platform 1610 may operate on the PII automatically for that purpose in a straightforward manner. In that case, the PII may not need to be specifically identified. In other examples, such as where the constituent data of entry 1610 is not already presorted into predetermined data field locations, means for identifying PII that is separate from, of integrated into, the access control layer of data platform 1610 may identify the PII and/or other data categories for which heightened view restrictions are to be applied according to the data access guidelines. A suitably trained machine learning or artificial intelligence algorithm may be utilized by access control layer to facilitate these functions.

The means for identifying PII may be, or may include, processor(s) and/or application specific integrated circuit(s) (ASIC) programmed, or otherwise capable of, identifying the PII in the received data constituting entry 1601. In another example, the access control layer encrypts or otherwise obfuscates PII of a user (1640A and/or 1640B) making the request to access the one or more entries 1601 stored in the distributed ledger. This function may be performed according to the present technology either instead of, or in addition to, the aforementioned treatment of PII in the data of entry 1601, and may similarly be dictated, at least in part, by the data access guidelines. The means for identifying PII may be further programmed to, or otherwise capable of, assigning the access level to constituent data parts of entry 1601 received by data platform 1610. These access levels dictate what is needed for users (1640A and/or 1640B) to review each of the entries according to the above-described data access guidelines. For instance, a request to view PII stored in the private blockchain 1631 may, according to the data access guidelines, require that the request received by data platform 1610 include an access code assigned to one of users 1640B and, in some embodiments, that the request additionally include data representative of a biometric identifier (e.g., a fingerprint and/or iris scan signature) associated with an individual user 1640B. By contrast, a request to view Type and/or Amount, but not PII, would require no access code whatsoever for viewing access privileges to be granted to either a user 1640A or a user 1640B.

Although PII is shown in FIG. 16 as a discrete and singular category of data of the cryptocurrency transaction entry 1601, it is to be understood that PII may include two or more separate and distinct categories of PII data. For example, and without limitation, PII may include not one a person's full name, it may also include their address, driver license number, a national ID number (e.g., social security number in the USA), telephone number(s), email address(es), sex or gender, etc. In one embodiment, the means for identifying PII may be programmed to, or otherwise capable of, classifying data within one or more entries 1601 into one or more PII data categories. In received in unencrypted or non-obfuscated form, data platform 1610 and/or means for identifying PII may encrypt or obfuscate some or all of the received PII. In one embodiment, different levels of encryption and/or obfuscation may be set for each of the one or more PII data categories. In an example, the privacy laws of a first jurisdiction (nation or state) require that all PII besides sex or gender of an individual be protected. A cryptocurrency exchange agent would, at their option, be able to retain, and even possibly publish, sex or gender information of people they perform exchanges for. However, they would not be able to retain or publish any of that customer's other PII. Thus, the data access guidelines framework enable compliance with the privacy laws of the first country and, although the customer may need to enter their name and several other pieces of PII as part of their transaction with the cryptocurrency exchange agent, such PII other than the customer's sex or gender will ultimately reside in the private blockchain 1631 and be protected from viewing by the public at large and only be viewable by users 1640B for sanctioned legitimate purposes, as described herein, and according to the present technology.

In another example, a second jurisdiction (nation or state) has privacy laws requiring that no PII, even sex or gender, may be made public under any circumstances. This is a stricter law to comply with as compared to the first jurisdiction. In this case, the systems and methods can easily accommodate the changed circumstances of the second jurisdiction by adapting automatically using the changed data access guidelines. So, a customer transacting with a cryptocurrency exchange agent in the second jurisdiction, and likewise the agent, will be assured that the customer's PII will be handled, processed, and stored in compliance with the stricter privacy laws. Laws of a particular jurisdiction may change over time. The systems and methods of the present technology can accommodate that by simply receiving updated data access guidelines. These updates may themselves be received by data platform 1610 similarly to requests to access the segment(s) or portion(s) of the entries 1610 stored in the distributed ledger. Accordingly, transmissions of updated data access guidelines to data platform 1610 may include access codes or other authentication data to ensure they are legitimate and originate from authorized users (e.g., 1640B). In any case, the system and method of the present technology can seamlessly adapt and proceed accordingly to for the benefit of businesses and their customers, along with government and other regulators having an interest in details of the respective transactions.

Figure 17:
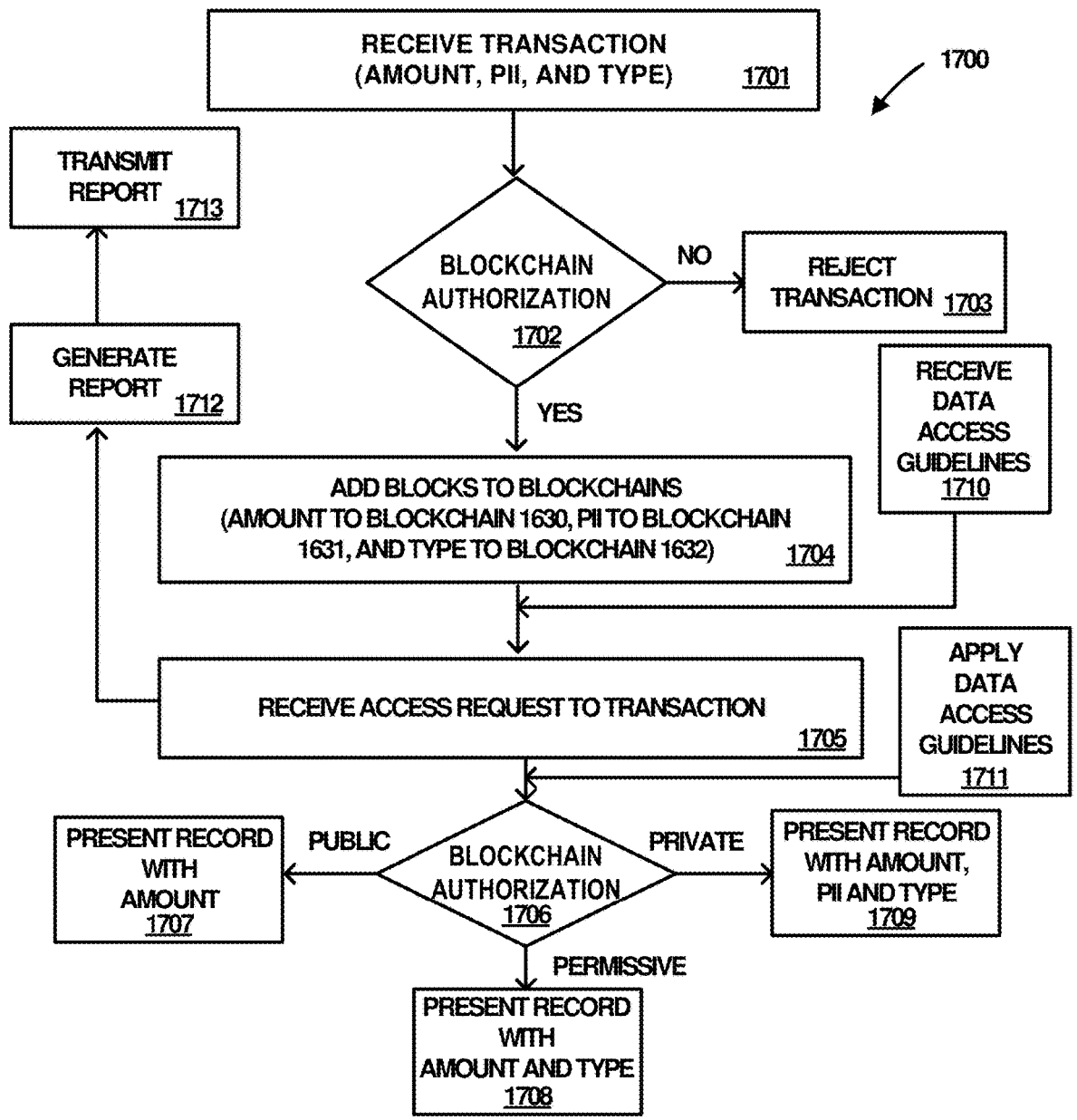
FIG. 17 illustrates a flow diagram in an implementation to generate a customized view of restricted transactions recorded into a blockchain.

FIG. 17 illustrates a flow diagram in an implementation to generate a customized view of restricted transactions recorded into a blockchain. Some or all of the steps of view customization process 1700 may be implemented in program instructions in the context of a component or components of the application used to carry out the customized view feature.

In operation, data platform 1610 receives block entry 1601 which is to be maintained in blocks of blockchains 1630-1632 (step 1701). Block entry 1601 is requested by a user (1640A and/or 1640B) from a user device in the distributed network of nodes and contains the data portions. Data platform 1610 then authorizes the entry (e.g., miners validate the hash in the block) (step 1702). If the block is not validated, the transaction (block entry 1601) is rejected (step 1703). However, if the block is accepted, each of the portions of data is evaluated for an access level and added to a block in each of blockchains 1630-1632 based on the identified access level (step 1704), which may be assigned according to the data access guidelines.

In a next operation, data platform 1610 receives a request to view one or more data segments or portions of a block entry (step 1705). In some embodiments, prior to the receiving step 1705, data platform 1610 receives the above-described data access guidelines (step 1710), which govern access by a user (e.g., user 1640A and/or 1640B) to one or more entries stored in the distributed ledger. The request may include an access code associated with at least one access level. The access code may be associated with a public, permissive, or private access level. Data platform 1610 then evaluates the access code in the request with each of blockchains 1630-1632 maintaining each of the separate block records for each of the data portions (step 1706). If the access code associated with the requesting user is determined to be public, a customized view (e.g., record 1602A) will be generated for the requesting user (e.g., 1640A) indicating, for example, only Amount from block entry 1601 (step 1707). If the access code associated with the requesting user (e.g., 1640A) is determined to be permissive, a customized view (e.g., record 1602A) will be generated for the requesting user indicating Amount and Type from block entry 1601 (step 1708). If the access code associated with the requesting user is determined to be private, a customized view (e.g., record 1602B) will be generated for the requesting user (e.g., 1640B) indicating all portions of the data from block entry 1601 (i.e., Amount, Type, and PII) (step 1709).

In some embodiments, the evaluating step 1706 includes, or is substituted by, a step 1711 of applying the data access guidelines for the user (1640A and/or 1640B) to the request received in step 1705 via the communications interface of data platform 1610. Additionally, in the embodiment, data segments or portions within the one or more entries 1610 stored in the distributed ledger that are accessible (e.g., viewable) according to the data access guidelines are identified. In an example, the authorizing step 1706 may include validating the request received in step 1705 from the user (1640A and/or 1640B) to generate the customized view of the data segments or portions within the one or more entries 1601 stored in one or more of the respective blockchains 1630 (public), 1631 (private) and/or 1632 (permissive). This validating is a separate and distinct operation or set of operations from step 1702 in view customization process 1700, and may be performed, implemented and/or otherwise facilitated by a means for validating the request of step 1705, which may be an integral functional part of data platform 1610 (e.g., access control layer, other processor(s) and/or ASICs, controller 1800, and the like), or which may be a separate component capable of performing this function in the systems and methods according to the present technology.

View customization process 1700 may also include a report generation step 1712. In an embodiment, access control layer and/or other functional components of data platform 1610 may generate one or more reports including the customized view of the data segments or portions within the one or more entries 1601 stored in the distributed ledger. The specifications and/or format of such reports may be specified by the data access guidelines. For example, and without limitation, a tax authority of a government may require an operator of data platform 1610 who provides their service to an online cryptocurrency exchange platform to transmit (e.g., using communications component of data platform 1610 at step 1713 of process 1700) a report including PII, Amount and Type for all transactions over a specified time period. The report may be formatted by a report generation function of data platform 1610 so as to be easily read by a human being, including after being printed out on paper using a user device operated by a representative user 1640B. As another example, a professor of economics (e.g., a representative user 1640A) at university may desire to receive reports of the same transactions that do not include any PII. This user 1640A may pay an operator of data platform 1610 for this service, as in a subscription model for access to both public 1630 and permissive 1632 blockchains according to the systems and methods of the present technology.

In some embodiments, the data access guidelines may include a reporting schedule for the aforementioned report(s). As an example, the government tax auditor may desire to receive quarterly reports of cryptocurrency transactions include Amount, Type and PII because that reporting schedule may coincide with quarterly business or personal income tax filings required to be made by the persons or entities transacting with cryptocurrency exchanges. In the embodiment, the data platform 1610 and its communications component may be programmed, or otherwise configured to, periodically transmit the report(s) to the user(s) (1640A and/or 1640B) according to the reporting schedule specified by the data access guidelines.

Another implementation for flow diagram 1700 may modify FIG. 16's use cases described above for application to an e-commerce payment processor service (e.g., Paypal®) accepting payment in cryptocurrency, including its stable coin variants, for goods or services. In such cases, entry 1601 may instead take the form of an e-commerce transaction entry in which the Amount data may instead be the amount of money spent on the good or service, and Type may remain an identifier of which cryptocurrency was used to pay for the good or service. For one reason or another, a person making a payment for goods or services on an e-commerce website or other platform that uses a payment processor like Paypal® may use the cryptocurrency for payment for its pseudonymous aspects, where the person's PII may not be available for viewing by the provider of the goods or services. Nevertheless, as with the use cases described above with reference to FIGS. 16 and 17, governmental or other regulators may desire, or indeed legally require, the PII to be entered and retained using, for example, the systems and methods according to the present technology. It may be readily appreciated how the above description with reference to FIGS. 16 and 17 may be readily applied without undue experimentation to a wide variety of use cases, including e-commerce payment processing, where PII or other sensitive transaction data that is subject to jurisdiction-specific laws, rules and/or regulations must be handled in a legally compliant manner and in a way that proceeds with little to no manual involvement of operators of data platofrm 1610, the entities that it services, those entities' customers, and regulators or those entities and customers.

FIG. 18 illustrates a block diagram illustrating an example machine representing the computer systemization of the host computer system. Controller 1800 may be in communication with entities including one or more users 1825 client/terminal devices 1820, user input devices 1805, peripheral devices 1810, optional co-processor device(s) (e.g., cryptographic processor devices) 1815, and networks 1830. Users may engage with controller 1800 via terminal devices 1820 over networks 1830. In some embodiments, all or a portion of the communications between terminal devices 1820 and controller 1800 can be encrypted. Various laws, standards, or best practices may require cryptography for storing, transmitting, and/or utilization of various types data, information, code, signaling, etc.

Computers may employ central processing units (CPUs) or processors to process information. Processors may include programmable general-purpose or special-purpose microprocessors, programmable controllers, ASICs, programmable logic devices (PLDs), embedded components, a combination of such devices and the like. Processors execute program components in response to user and/or system-generated requests. One or more of these components may be implemented in software, hardware or both hardware and software. Processors pass instructions (e.g., operational and data instructions) to enable various operations.

Controller 1800 may include clock 1865, CPU 1870, memory such as read only memory (ROM) 1885 and random access memory (RAM) 1880 and co-processor 1875 among others. These controller components may be connected to a system bus 1860, and through the system bus 1860 to an interface bus 1835. Further, user input devices 1805, peripheral devices 1810, co-processor devices 1815, and the like, may be connected through the interface bus 1835 to the system bus 1860. The interface bus 1835 may be connected to a number of interface adapters such as processor interface 1840, input output interfaces (I/O) 1845, network interfaces 1850, storage interfaces 1855, and the like.

Processor interface 1840 may facilitate communication between co-processor devices 1815 and co-processor 1875. In one implementation, processor interface 1840 may expedite encryption and decryption of requests or data. Input output interfaces (I/O) 1845 facilitate communication between user input devices 1805, peripheral devices 1810, co-processor devices 1815, and/or the like and components of controller 1800 using protocols such as those for handling audio, data, video interface, wireless transceivers, or the like (e.g., Bluetooth®, IEEE 894a-b, serial, universal serial bus (USB), Digital Visual Interface (DVI), 802.11a/b/g/n/x, cellular, etc.). Network interfaces 1850 may be in communication with the network 1830. Network interface 1850 may be embodied in a communications component and may be referred to as such herein. Through the network 1830, controller 1800 may be accessible to remote terminal devices 1820. Network interfaces 1850 may use various wired and wireless connection protocols such as, direct connect, Ethernet, wireless connection such as IEEE 802.11a-x, miracast and the like. Some components of the interactive gaming system may include various protocols or comply with various standards or certifications set forth by different associations or regulatory agencies. For example, some embodiments may use the slot accounting system (SAS) protocol or comply with the game to system (G2S) standard.

Examples of network 1830 include the Internet, Local Area Network (LAN), Metropolitan Area Network (MAN), a Wide Area Network (WAN), wireless network (e.g., using Wireless Application Protocol WAP), a secured custom connection, and the like. The network interfaces 1850 can include a firewall which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities.

The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the scope and spirit of this disclosure. It should be appreciated that controller 1800 may be capable of using network interfaces 1850 to transfer and receive payment amounts. The payment may be driven by an application executed by controller 1800, such as a National Fighting Club (NFC) application tap using Bluetooth®.

Storage interfaces 1855 may be in communication with a number of storage devices such as, storage devices 1890, removable disc devices, and the like. The storage interfaces 1855 may use various connection protocols such as Serial Advanced Technology Attachment (SATA), IEEE 894, Ethernet, Fiber, Universal Serial Bus (USB), and the like.

User input devices 1805 and peripheral devices 1810 may be connected to I/O interface 1845 and potentially other interfaces, buses and/or components. User input devices 1805 may include card readers, finger print readers, joysticks, keyboards, microphones, mouse, remote controls, retina readers, touch screens, sensors, and/or the like. Peripheral devices 1810 may include antenna, audio devices (e.g., microphone, speakers, etc.), cameras, external processors, communication devices or components, radio frequency identifiers (RFIDs), scanners, printers, storage devices, transceivers, and/or the like. Co-processor devices 1815 may be connected to controller 1800 through interface bus 1835, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. Controller 1800 may employ various forms of memory including on-chip CPU memory (e.g., registers), RAM 1880, ROM 1885, and storage devices 1890. Storage devices 1890 may employ any number of tangible, non-transitory storage devices or systems such as fixed or removable magnetic disk drive, an optical drive, solid state memory devices and other processor-readable storage media. Computer-executable instructions stored in the memory may include an interactive gaming platform having one or more program modules such as routines, programs, objects, components, data structures, and so on that perform particular tasks or implement particular abstract data types. For example, the memory may contain operating system (OS) component 1895, modules and other components, database tables, and the like. These modules/components may be stored and accessed from the storage devices, including from external storage devices accessible through an interface bus 1835.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

Controller 1800 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of controller 1800 may be distributed electronically over the Internet or over other networks (including wireless networks). Those skilled in the relevant art(s) will recognize that portions of the interactive gaming system may reside on a server computer, while corresponding portions reside on a client computer. Data structures and transmission of data particular to aspects of controller 1800 are also encompassed within the scope of the disclosure.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

Having described several embodiments, it will be recognized by those of skill in the art that various modifications, alternative constructions, and equivalents may be used without departing from the spirit of the technology. Additionally, a number of well-known processes and elements have not been described in order to avoid unnecessarily obscuring the present technology. Accordingly, the above description should not be taken as limiting the scope of the technology, which is defined in the following claims.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system comprising:
    a blockchain network communicably coupled to one or more endpoints,
        wherein the blockchain network includes a plurality of nodes that maintain a distributed ledger;
    a communications component to receive:
        data access guidelines comprising a framework for how the one or more entries are to be routed for processing and storage in the distributed ledger, the framework governing access by a user to one or more entries stored in the distributed ledger; and
a request from the user to access the one or more of the entries stored in the distributed ledger;
an access control layer to:
apply the data access guidelines for the user to the request received via the communications component; and
identify segments within the one or more entries stored in the distributed ledger that are accessible according to the data access guidelines, wherein the segments are based on at least one of: the request from the user and a transaction format; and
means for validating the request from the user to generate a customized view of the segments within the one or more entries stored in the distributed ledger.

2. The system of claim 1, wherein at least a portion of the one or more entries stored in the distributed ledger includes personally identifying information (PII).

3. The system of claim 1, wherein the access control layer is configured to obfuscate PII of the user making the request to access the one or more entries.

4. The system of claim 1 further comprising means for identifying PII in the one or more entries stored in the distributed ledger.

5. The system of claim 4, wherein the means for identifying PII is configured to assign an access level needed to review each of the entries according to the data access guidelines.

6. The system of claim 4, wherein the means for identifying PII is configured to classify data within each of the entries into one or more PII data categories.

7. The system of claim 6, wherein the access control layer then sets a different encryption level for each of the one or more PII data categories of PII data classified by the means for identifying PII.

8. The system of claim 1, wherein the access control layer is configured to generate a report including the customized view of the segments within the one or more entries stored in the distributed ledger, wherein a format of the report is specified by the data access guidelines.

9. The system of claim 8, wherein the communications component is configured to transmit the report to the user.

10. The system of claim 9, wherein the data access guidelines include a reporting schedule for the report including the customized view, and wherein the communications component is further configured to periodically transmit the report to the user according to the reporting schedule.

11. The system of claim 1, wherein the segments within the one or more entries include at least one of a private access level, a permissive access level, or a public access level.

12. The system of claim 1, wherein the user is associated with a regulatory agency.

13. A method for generating a customized view of blockchain-stored data, the method comprising:
receiving data access guidelines comprising a framework for how the one or more entries are to be routed for processing and storage in the distributed ledger, the framework governing access by a user to one or more data portions of a block entry maintained in a blockchain;
receiving a request from the user to view the one or more data portions of the block entry maintained in the blockchain;
applying the data access guidelines for the user to the request;
identifying the one or more data portions maintained in the blockchain that are accessible according to the data access guidelines, wherein the data portions are based on at least one the request from the user and a transaction format; and
generating a customized view of the block entry including any of the one or more data portions determined to be accessible by the request.

14. The method of claim 13, wherein at least a portion of the one or more data portions includes personally identifying information (PII).

15. The method of claim 13 further comprising removing or obfuscating PII of the user making the request to view one or more data portions of the block entry.

16. The method of claim 13 further comprising identifying PII in the one or more data portions of the block entry maintained in the blockchain.

17. The method of claim 16, wherein identifying PII in the one or more data portions comprises assigning an access level needed to review each of the one or more data portions according to the data access guidelines.

18. The method of claim 16 further comprising classifying data within each of the one or more data portions into one or more PII data categories.

19. The method of claim 18 further comprising setting a different encryption level for each of the one or more PII data categories.

20. The method of claim 13 further comprising generating a report including the customized view of the block entry including the any of the one or more data portions determined to be accessible by the request, wherein a format of the report is specified by the data access guidelines.

21. The method of claim 20 further comprising transmitting the report to the user.

22. The method of claim 21, wherein the data access guidelines include a reporting schedule for the report including the customized view, and wherein transmitting the report to the user comprises periodically transmitting the report to the user according to the reporting schedule.

23. The method of claim 13, wherein the one or more data portions of the block entry include at least one of a private access level, a permissive access level, or a public access level.

24. The method of claim 13, wherein the user is associated with a regulatory agency.

25. A non-transitory computer-readable medium having program instructions stored thereon which, when executed by one or more processors, cause the one or more processors to:
receive data access guidelines comprising a framework for how the one or more entries are to be routed for processing and storage in the distributed ledger, the framework governing access by a user to one or more data portions of a block entry maintained in a blockchain;
receive a request from the user to view the one or more data portions of the block entry maintained in the blockchain;
apply the data access guidelines for the user to the request;
identify the one or more data portions maintained in the blockchain that are accessible according to the data access guidelines, wherein the one or more data portions are based on at least one of: the request from the user and a transaction format; and generate a customized view of the block entry including any of the one or more data portions determined to be accessible by the request.

\* \* \* \* \*